(12) United States Patent
Hori et al.

(10) Patent No.: US 11,090,705 B2
(45) Date of Patent: Aug. 17, 2021

(54) CUTTING DEVICE AND SHEET MATERIAL MANUFACTURING METHOD

(71) Applicant: TOYOTA JIDOSHA KABUSHIKI KAISHA, Toyota (JP)

(72) Inventors: Yoshihiro Hori, Nisshin (JP); Yasuyuki Ueyama, Soraku-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 389 days.

(21) Appl. No.: 16/181,720

(22) Filed: Nov. 6, 2018

(65) Prior Publication Data

US 2019/0176206 A1 Jun. 13, 2019

(30) Foreign Application Priority Data

Dec. 8, 2017 (JP) .............................. JP2017-236446

(51) Int. Cl.
*B21D 28/26* (2006.01)
*B21D 28/02* (2006.01)
*B21D 28/14* (2006.01)

(52) U.S. Cl.
CPC .............. *B21D 28/26* (2013.01); *B21D 28/02* (2013.01); *B21D 28/14* (2013.01)

(58) Field of Classification Search
CPC ...... B21D 28/26; B21D 28/246; B21D 28/24; B21D 28/243; B21D 28/34; B21D 28/346; B21D 38/02; B21D 28/14; B21D 37/08; B21D 37/12; B21D 37/14; B21D 24/16; B21D 24/00; B21D 22/22; B21D 22/24; B26F 1/14; B26D 1/06; B30B 9/326; B30B 15/02; Y10S 100/918

USPC .................................................. 100/94, 98 R
See application file for complete search history.

(56) References Cited

U.S. PATENT DOCUMENTS

| 2010/0018277 A1* | 1/2010 | Hielscher ............. C21D 8/0252 72/352 |
| 2010/0139355 A1* | 6/2010 | Aramizu ................... B26F 1/40 72/326 |
| 2011/0067538 A1* | 3/2011 | Greenleaf .............. B21D 28/26 83/143 |

(Continued)

FOREIGN PATENT DOCUMENTS

| CN | 101557888 A | 10/2009 |
| EP | 2 098 311 A1 | 9/2009 |

(Continued)

*Primary Examiner* — Teresa M Ekiert
*Assistant Examiner* — Sarkis A Aktavoukian
(74) *Attorney, Agent, or Firm* — Finnegan, Henderson, Farabow, Garrett & Dunner, LLP

(57) ABSTRACT

A lower die has a first lower-die edge extending along the outline shape of a sheet material, and a plurality of second lower-die edges disposed vertically below the first lower-die edge and each extending in a direction traversing an offcut of a sheet base material that is left behind after the sheet material is punched out. An upper die has a first upper-die edge which extends along the first lower-die edge and between which and the first lower-die edge the sheet base material is shorn to punch out the sheet material, and a plurality of second upper-die edges which is provided so as to be protrusible to vertically below the second lower-die edges and between which and the second lower-die edges the offcut is shorn and divided.

8 Claims, 22 Drawing Sheets

(56) References Cited

U.S. PATENT DOCUMENTS

2017/0008186 A1* 1/2017 Honegger ............... B30B 15/16
2017/0197240 A1* 7/2017 Lord ...................... B21D 51/26

FOREIGN PATENT DOCUMENTS

| JP | 58-086940 A | 5/1983 | |
|---|---|---|---|
| JP | 06-297053 A | 10/1994 | |
| JP | 2008-126304 A | 6/2008 | |
| JP | 10-2009-0086224 A | 8/2009 | |
| JP | 5018040 B2 | 9/2012 | |
| JP | 2013-178993 | 9/2013 | |
| JP | 2016-170926 | 9/2016 | |
| JP | 2017-117780 | 6/2017 | |
| RU | 90372 | 1/2010 | |
| WO | WO-2011077557 A1 * | 6/2011 | ........... B21D 35/007 |
| WO | WO-2016150646 A1 * | 9/2016 | ............ B21D 28/26 |
| WO | WO-2017006861 A1 * | 1/2017 | ............. B21D 19/08 |

* cited by examiner

CUTTING DEVICE AND SHEET MATERIAL MANUFACTURING METHOD

INCORPORATION BY REFERENCE

The disclosure of Japanese Patent Application No. 2017-236446 filed on Dec. 8, 2017 including the specification, drawings and abstract is incorporated herein by reference in its entirety.

BACKGROUND

1. Technical Field

The present disclosure relates to a sheet material cutting device and a sheet material manufacturing method.

2. Description of Related Art

An disclosure related to the technology of manufacturing a membrane electrode assembly for a fuel cell is conventionally known (see Japanese Patent Application Publication No. 2013-178993 (JP 2013-178993 A)). JP 2013-178993 A discloses a membrane electrode assembly manufacturing method in which a membrane electrode assembly including a gas diffusion layer is cut such that a cut surface is formed along a stacking direction. This conventional manufacturing method is characterized by having the following steps.

First, an upper die having a first flat surface parallel to the cut surface is disposed such that the first flat surface is located on one side of the position of a plane including the cut surface. A lower die having a second flat surface parallel to the cut surface is disposed such that the second flat surface is located on the other side of the position of the plane including the cut surface. Then, the upper die is moved relative to the lower die in the stacking direction. Thus, the cut surface is formed by a shearing process in the membrane electrode assembly along the stacking direction of the membrane electrode assembly.

According to this conventional membrane electrode assembly manufacturing method, cutting is performed by the shearing process using the upper die and the lower die. Although the shearing process is performed by the combination of the respective edges of the upper die and the lower die, these edges are not required to be sharp. Thus, this method can slow the wearing of the blade part for a prolonged service life.

SUMMARY

In the above conventional membrane electrode assembly manufacturing method, a long band-shaped sheet stack is conveyed to a cutting position by driving conveyor rollers, and a rectangular region including a cathode-side catalyst layer is consecutively punched out by the shearing process, so that a ladder-shaped offcut having a plurality of rectangular openings is left behind. If one tries to collect such an offcut by rolling it up, the offcut sags and becomes unevenly tensioned during rolling up, which may result in problems such as rolling misalignment and fracture of the offcut.

To convey the ladder-shaped offcut having a plurality of rectangular openings as described above by conveyor rollers, it is required that portions remaining on both sides of the opening after the rectangular region is punched out of the band-shaped sheet stack are wide enough to withstand tension during conveyance. For this reason, increased portions are left as the offcut, in which a large amount of catalyst layer containing an expensive electrolyte membrane and noble metal remains, causing an increase in the manufacturing cost.

The present disclosure provides a sheet material cutting device and a sheet material manufacturing method.

A first aspect of the present disclosure relates to a cutting device that includes a lower die and an upper die movable relative to each other and cuts a sheet material out of a sheet base material by shearing. The lower die has a first lower-die edge extending along the outline shape of the sheet material, and a plurality of second lower-die edges disposed vertically below the first lower-die edge and each extending in a direction traversing an offcut of the sheet base material that is left behind after the sheet material is punched out. The upper die has a first upper-die edge that extends along the first lower-die edge, and a plurality of second upper-die edges that is provided so as to be protrusible to vertically below the second lower-die edges. The sheet base material is shorn to punch out the sheet material between the first upper-die edge and the first lower-die edge. The offcut is shorn and divided between the second upper-die edges and the second lower-die edges.

In the cutting device according to this aspect, first, the sheet base material is disposed between the lower die and the upper die in a state where the lower die and the upper die are released and separated from each other. In this state, the lower die and the upper die are moved relative to each other such that the lower die and the upper die come closer to each other. Thus, the sheet base material is sandwiched between the first lower-die edge extending along the outline shape of the sheet material to be punched out of the sheet base material and the first upper-die edge extending along this first lower-die edge. For example, the extension directions of the first lower-die edge and the first upper-die edge are directions substantially orthogonal to a relative movement direction of the upper die and the lower die.

When the lower die and the upper die are further moved relative to each other in this state in the direction of coming closer to each other, a shear stress is exerted on the sheet base material sandwiched between the first lower-die edge and the first upper-die edge, so that the sheet base material is shorn between the first lower-die edge and the first upper-die edge. Thus, the sheet material punched out of the sheet base material remains on the first lower-die edge, while the offcut that is the remainder of the sheet base material left behind after the sheet material is punched out is separated from the sheet material and moved to below the first lower-die edge.

The offcut of the sheet base material is moved to below the first lower-die edge, and is disposed on the second lower-die edges that are provided below the first lower-die edge and each extend in the direction traversing the offcut. At this point, the offcut is sandwiched between the second lower-die edges and the second upper-die edges. When the second upper-die edges are protruded to below the second lower-die edges in this state, a shear stress is exerted on the offcut sandwiched between the second lower-die edges and the second upper-die edges, so that the offcut is shorn and segmented into a plurality of small pieces.

For example, the extension direction of each second lower-die edge is a direction intersecting the extension direction of the first lower-die edge adjacent to that second lower-die edge, and for example, is a direction orthogonal to the extension direction of the first lower-die edge adjacent to that second lower-die edge. The extension direction of each second upper-die edge is a direction along the extension direction of the second lower-die edge facing that second upper-die edge, and for example, is a direction parallel to the extension direction of the second lower-die edge facing that second upper-die edge. For example, the extension directions of the second lower-die edges and the second upper-die edges are directions substantially orthogonal to the relative movement direction of the upper die and the lower die.

Thus, according to the above aspect of the cutting device of the present disclosure, the offcut of the sheet base material can be segmented into a plurality of small pieces immediately after the sheet material is punched out of the sheet base material, which can facilitate the collection of the offcut and reduce the manufacturing cost. In particular, when the sheet base material is a stack used to manufacture a membrane electrode assembly (MEA) for a fuel cell and includes two or more of a gas diffusion layer (GDL), a micro porous layer (MPL), a catalyst layer, and a polymer electrolyte membrane (PEM), it is possible to reduce the generation amount of the offcut containing an expensive material and thereby reduce the manufacturing cost of the fuel cell.

In the above aspect of the cutting device of the present disclosure, the lower die may have a support part that supports the sheet material punched out of the sheet base material. An outer edge of an upper end surface of the support part may include the first lower-die edge. The upper die may have a frame-shaped part provided so as to surround the first lower-die edge. An inner edge of a lower end surface of the frame-shaped part may include the first upper-die edge.

In this case, when the lower die and the upper die are moved relative to each other such that the frame-shaped part of the upper die comes closer to the support part of the lower die in the state where the sheet base material is disposed between the lower die and the upper die, the sheet base material is sandwiched between the upper end surface of the support part of the lower die and the lower end surface of the frame-shaped part of the upper die. When the lower die and the frame-shaped part of the upper die are further moved relative to each other in this state in the direction of coming closer to each other, the upper end surface of the support part of the lower die enters to an inner side of the inner edge of the lower end surface of the frame-shaped part of the upper die. At this point, the sheet base material is shorn between the first lower-die edge provided at the outer edge of the upper end surface of the support part of the lower die and the first upper-die edge provided at the inner edge of the lower end surface of the frame-shaped part of the upper die. The sheet material that has been punched out remains on the upper end surface of the support part of the lower die, while the offcut of the sheet base material left behind after the sheet material is punched out is moved to below the upper end surface of the support part of the lower die.

The outline shape of the upper end surface of the support part of the lower die is a shape corresponding to the outline shape of the sheet material to be punched out of the sheet base material. For example, when the outline shape of the sheet material is a rectangular shape, the outline shape of the upper end surface of the support part of the lower die is also a rectangular shape, and the support part has a substantially prism shape. The shape of the frame-shaped part of the upper die is a shape corresponding to the shape of the support part of the lower die. Thus, when the outline shape of the upper end surface of the support part of the lower die is a rectangular shape, the outline shape of the lower end surface of the frame-shaped part of the upper die is a rectangular frame shape. At least a portion of the frame-shaped part of the upper die in which the support part of the lower die is received has a rectangular tubular shape.

In the above aspect of the present disclosure, the lower die may have a third lower-die edge extending so as to surround the first lower-die edge. The upper die may have a third upper-die edge extending along the third lower-die edge. When protruded vertically downward, the second upper-die edges may be inserted into a clearance between the first lower-die edge and the third lower-die edge such that the frame-shaped offcut is shorn and segmented between the second upper-die edges and the second lower-die edges.

In this case, when the lower die and the upper die are moved relative to each other so as to come closer to each other in the state where the sheet base material is disposed between the lower die and the upper die, the third upper-die edge extending along the third lower-die edge that extends so as to surround the first lower-die edge enters to the inner side of this third lower-die edge. For example, the extension directions of the third lower-die edge and the third upper-die edge are directions substantially orthogonal to the relative movement direction of the upper die and the lower die.

When the lower die and the upper die are further moved relative to each other in this state in the direction of coming closer to each other, a wall surface of the upper die extending upward from the third upper-die edge is guided by a wall surface of the lower die extending downward from the third lower-die edge. At this point, as described above, a shear stress is exerted on the sheet base material sandwiched between the first lower-die edge and the first upper-die edge, so that the sheet base material is shorn between the first lower-die edge and the first upper-die edge. An outer peripheral edge of the sheet base material is located on an inner side of the third lower-die edge, with a clearance left between the outer peripheral edge of the sheet base material and the third lower-die edge.

Thus, the sheet material is punched out of the sheet base material and the frame-shaped offcut is left behind. The frame-shaped offcut is moved downward through the clearance between the first lower-die edge and the third lower-die edge, and is disposed on the second lower-die edges disposed below the first lower-die edge. Moreover, the frame-shaped offcut is sandwiched between the second lower-die edges and the second upper-die edges below the clearance between the first lower-die edge and the third lower-die edge.

When the second upper-die edges are protruded to below the second lower-die edges in this state, a shear stress is exerted on the frame-shaped offcut sandwiched between the second lower-die edges and the second upper-die edges facing each other in a vertical direction, so that the frame-shaped offcut is shorn at a plurality of locations and segmented into a plurality of small pieces.

In the above aspect of the present disclosure, the lower die may have a plurality of bridges each extending in a direction intersecting the extension direction of the first lower-die edge and located vertically below the first lower-die edge, and an outer peripheral part surrounding the support part. Side edges, facing each other, of upper end surfaces of a pair of the bridges facing each other in the extension direction of the first lower-die edge may include the second lower-die edges. An inner edge of an upper end surface of the outer peripheral part may include the third lower-die edge. The frame-shaped part may include a main body and protractible parts, and an inner edge and an outer edge of a lower end surface of the frame-shaped part may include the first upper-die edge and the third upper-die edge, respectively. The protrusible parts may be provided so as to be protrusible to vertically below the main body, and when protruded, be each inserted between a pair of the bridges that are adjacent to each other, and both end edges of a lower end surface of the protrusible part that intersect the extension direction of the first upper-die edge and the third upper-die edge may include the second upper-die edges.

In this case, when the lower die and the upper die are moved relative to each other so as to come closer to each other in the state where the sheet base material is disposed between the lower die and the upper die, the sheet base material is sandwiched between the upper end surface of the support part of the lower die and the lower end surface of the frame-shaped part of the upper die. When the lower die and the frame-shaped part of the upper die are further moved relative to each other in this state so as to come closer to each other, the lower end surface of the frame-shaped part of the upper die is inserted into a clearance of the lower die between the upper end surface of the outer peripheral part and the upper end surface of the support part.

Thus, the sheet base material is shorn between the first lower-die edge provided at the outer edge of the upper end surface of the support part and the first upper-die edge provided at the inner edge of the lower end surface of the frame-shaped part. Moreover, the wall surface extending downward from the third lower-die edge provided at the inner edge of the upper end surface of the outer peripheral part guides the wall surface extending upward from the third upper-die edge provided at the outer edge of the lower end surface of the frame-shaped part. Thus, the sheet material is punched out of the sheet base material, and the sheet base material is separated into the sheet material and the frame-shaped offcut.

Each protrusible part is disposed between portions of the main body so as to be movable to below the main body. However, in a state where the protrusible parts are not protruded to below the main body, the lower end surface of the main body and the lower end surfaces of the protrusible parts are flush without a level difference therebetween. In this state, the first upper-die edge that is continuous in a circumferential direction at the inner edge of the lower end surface of the frame-shaped part is formed by an edge that is an inner edge of the lower end surface of the main body and edges that are inner edges of the lower end surfaces of the protrusible parts between portions of the main body. Moreover, the third upper-die edge that is continuous in the circumferential direction at the outer edge of the lower end surface of the frame-shaped part is formed by an edge that is an outer edge of the lower end surface of the main body and edges that are outer edges of the lower end surfaces of the protrusible parts between portions of the main body.

Thus, in the state where the protrusible parts are not protruded to below the main body, the lower end surface of the frame-shaped part of the upper die can be inserted into the clearance between the support part and the outer peripheral part of the lower die, to thereby shear the sheet base material and separate the sheet base material into the sheet material and the frame-shaped offcut. More specifically, the sheet base material can be shorn by the first upper-die edge and the first lower-die edge facing each other in the vertical direction, and at the same time, the wall surface extending upward from the third upper-die edge can be guided by the wall surface extending downward from the third lower-die edge, on an outer side of the shearing position. The frame-shaped offcut shorn off from the sheet base material is moved downward through the clearance between the support part and the outer peripheral part of the lower die, and is disposed on the bridges each extending in the direction intersecting the extension direction of the first lower-die edge located above the bridges, and is then sandwiched between the upper end surfaces of the bridges and the lower end surface of the main body of the frame-shaped part.

The frame-shaped offcut is sandwiched between the second lower-die edges located at the side edges of the upper end surfaces of the bridges and the second upper-die edges located at both end edges of the lower end surfaces of the protrusible parts of the frame-shaped part in the circumferential direction of the frame-shaped part. In this state, the lower end surfaces of the protrusible parts of the frame-shaped part of the upper die are protruded to below the lower end surface of the main body and the upper end surfaces of the bridges and inserted between the upper end surfaces of the bridges. Thus, a shear stress is exerted on the frame-shaped offcut sandwiched between the second lower-die edges located at the side edges, facing each other, of the upper end surfaces of each pair of bridges that are adjacent to each other and the second upper-die edges located at both end edges of the lower end surfaces of the protrusible parts, so that the frame-shaped offcut is shorn at a plurality of locations and segmented into a plurality of small pieces.

In the above aspect of the present disclosure, the lower die may have a plurality of support parts that is arrayed in one direction orthogonal to the relative movement direction of the upper die and the lower die. The bridges may each extend along the one direction from a side surface of the support part intersecting the one direction.

In this case, when the lower die and the upper die are moved relative to each other so as to come closer to each other in the state where the sheet base material is disposed between the lower die and the upper die, the sheet base material is sandwiched between the upper end surfaces of the support parts of the lower die and the lower end surface of the frame-shaped part of the upper die. In this state; the frame-shaped part of the upper die is further relatively moved toward the lower die. Here, for example, the frame-shaped part of the upper die is provided so as to surround each support part, and is inserted not only into a clearance between the outer peripheral part and the support parts of the lower die but also into a clearance between one support part and another support part arrayed in the one direction.

Thus, the sheet base material is shorn between the first lower-die edges provided at the outer edges of the upper end surfaces of the support parts of the lower die and the first upper-die edge provided at the inner edge of the lower end surface of the frame-shaped part of the upper die. Moreover, the wall surface extending upward from the third upper-die edge provided at the outer edge of the lower end surface of the frame-shaped part of the upper die is guided by the wall surface extending downward from the third lower-die edge provided at the inner edge of the upper end surface of the outer peripheral part of the lower die. As a result, a plurality of sheet materials is punched out of the sheet base material at once, and the sheet base material is separated into the sheet materials and the frame-shaped offcut.

In the above aspect of the present disclosure, the lower die may have two bridges on the side surface of the support part, at an interval in the extension direction of the first lower-die edge extending along the side surface.

In this case, the frame-shaped offcut of the sheet base material left behind after the sheet materials are punched out is disposed on the upper end surfaces of the two bridges extending along the one direction from the side surface intersecting the one direction of each of the support parts arrayed in the one direction. Two bridges are disposed on the side surface of each support part intersecting the one direction that is an array direction of the support parts, at an interval in the extension direction of the first lower-die edge extending along the side surface.

Here, the frame-shaped offcut extends in the one direction that is the array direction of the support parts, and has a plurality of openings that is formed as the sheet materials are punched out at intervals in the one direction. More specifically, the frame-shaped offcut has longitudinal frame parts extending in the one direction, on both sides of the openings in a direction intersecting the one direction, and cross frame parts extending in the direction intersecting the one direction, on both sides of each opening in the one direction.

Thus, the frame-shaped offcut is supported at each cross frame part from below by the two bridges that are disposed on the side surface of the support part intersecting the one direction, at an interval in the extension direction of the first lower-die edge extending along that side surface. In this state, each cross frame part of the frame-shaped offcut is sandwiched between a pair of second lower-die edges provided at the inner edges, facing each other, of the upper end surfaces of the two bridges disposed at an interval and a pair of second upper-die edges provided at both end edges of the lower end surface of the protrusible part of the upper die.

When the lower end surfaces of the protrusible parts of the upper die are protruded to below the upper end surfaces of the bridges of the lower die in this state, each cross frame part of the frame-shaped offcut is shorn between the pair of second lower-die edges, facing each other, of the two adjacent bridges and the pair of second upper-die edges of the lower end surface of the protrusible part. As a result, the frame-shaped offcut is divided into a plurality of cross frame offcuts excluding both ends of the cross frame parts, a first longitudinal frame offcut formed by one end of each cross frame part and one longitudinal frame part, and a second longitudinal frame offcut formed by the other end of each cross frame part and the other longitudinal frame part.

Since each cross frame offcut between two adjacent bridges is not supported by these two bridges, each cross frame offcut falls down through the clearance between these two bridges and is collected. The first longitudinal frame offcut and the second longitudinal frame offcut are each supported at portions of the ends of the cross frame parts from below by the bridges but not supported at the longitudinal frame part by the bridges, so that, under the force of gravity, the first longitudinal frame offcut and the second longitudinal frame offcut tilt toward their respective longitudinal frame parts, fall so as to slide down from above the bridges, and are collected. Thus, the offcut of the sheet base material is prevented from remaining on the lower die, and the offcut can be efficiently collected.

In the above aspect of the present disclosure, a recess may be included in the side surface of the support part, vertically above the bridge.

In this case, a clearance can be formed by the recess between the side surface of the support part and each of the first longitudinal frame offcut and the second longitudinal frame offcut when, under the force of gravity, the first longitudinal frame offcut and the second longitudinal frame offcut tilt toward their respective longitudinal frame parts and fall so as to slide down from above the bridges as described above. Thus, the first longitudinal frame offcut and the second longitudinal frame offcut are prevented from sticking to the side surface of the support part, and the first longitudinal frame offcut and the second longitudinal frame offcut are allowed to fall and be collected more reliably.

In the above aspect of the present disclosure, the upper die may include, on the inner side of the frame-shaped part, a guide that guides movement of the frame-shaped part. The sheet material may be sandwiched between the guide and the support part of the lower die. The guide may have a raised portion that is provided at a peripheral edge of a lower end surface of the guide and protrudes vertically downward.

In this case, movement of the frame-shaped part of the upper die can be stabilized by the guide, and the sheet base material can be sandwiched between the guide and the support part during shearing of the sheet base material to more reliably shear the sheet base material. Since the guide has the raised portion provided at the peripheral edge of the lower end surface and protruding downward, the outer edge of the sheet material to be cut out of the sheet base material can be more reliably held between the raised portion and the support part, so that the sheet material can be shorn more accurately and reliably.

A second aspect of the present disclosure relates to a sheet material manufacturing method of cutting a sheet material out of a sheet base material by shearing using a lower die and an upper die that are movable relative to each other. The manufacturing method includes punching out the sheet material by shearing the sheet base material between a first lower-die edge extending along the outline shape of the sheet material and a first upper-die edge extending along the first lower-die edge. In the process of punching out the sheet material, an offcut of the sheet base material that is left behind after the sheet material is punched out is shorn and segmented between a plurality of second upper-die edges and a plurality of second lower-die edges that is provided below the first lower-die edge, by protruding the second upper-die edges to vertically below the second lower-die edge.

In a cutting step of the sheet material manufacturing method according to this aspect, the sheet base material is disposed between the lower die and the upper die in a state where the lower die and the upper die are released and separated from each other, and the lower die and the upper die are moved relative to each other such that the lower die and the upper die come closer to each other. Then, the sheet base material is sandwiched between the first lower-die edge extending along the outline shape of the sheet material to be punched out of the sheet base material and the first upper-die edge extending along this first lower-die edge.

When the lower die and the upper die are further moved relative to each other in this state in the direction of coming closer to each other, a shear stress is exerted on the sheet base material sandwiched between the first lower-die edge and the first upper-die edge, and thereby the sheet base material is shorn between the first lower-die edge and the first upper-die edge. Then, the sheet material is punched out of the sheet base material and left on the first lower-die edge, while the offcut that is the remainder of the sheet base material left behind after the sheet material is punched out is separated from the sheet material and moved to below the first lower-die edge.

Moreover, the offcut of the sheet base material moved to below the first lower-die edge is disposed on the second lower-die edges provided below the first lower-die edge and each extending in a direction traversing the offcut, and is sandwiched between the second lower-die edges and the second upper-die edges.

Thereafter, an offcut segmenting step is further performed. Specifically, in the state where the offcut is sandwiched between the second lower-die edges and the second upper-die edges as described above, the second upper-die edges are protruded to below the second lower-die edges. Thus, a shear stress is exerted on the offcut of the sheet base material that is left behind after the sheet material is punched out and that is sandwiched between the second lower-die edges and the second upper-die edges, to thereby shear and segment the offcut between the second upper-die edges and the second lower-die edges.

Thus, according to the above aspect of the sheet material manufacturing method of the present disclosure, the offcut of the sheet base material can be segmented into a plurality of small pieces immediately after the sheet material is punched out of the sheet base material, which allows efficient collection of the offcut and a reduction of the manufacturing cost. In particular, when the sheet base material is a stack used to manufacture an MEA for a fuel cell and includes two or more of a GDL, MPL, CL, and PEM, it is possible to reduce the generation amount of the offcut containing an expensive material, or reduce the amount of expensive material discarded along with the offcut, or efficiently collect the offcut, and thereby reduce the manufacturing cost of the fuel cell.

In the above aspect of the present disclosure, in the process of punching out the sheet material, a wall surface extending downward from a third lower-die edge that extends so as to surround the first lower-die edge may be used to guide a wall surface extending upward from a third upper-die edge that extends along the third lower-die edge. In a process of shearing and segmenting the offcut of the sheet base material, the offcut having frame-shape may be shorn and segmented between the second upper-die edges and the second lower-die edges.

In this case, displacement of the lower die and the upper die while being moved relative to each other so as to come closer to each other is suppressed, so that the sheet base material sandwiched between the first lower-die edge and the first upper-die edge can be more accurately shorn between the first lower-die edge and the first upper-die edge by a shear stress exerted on the sheet base material as described above.

According to the above aspects of the present disclosure, the sheet material cutting device and the sheet material manufacturing method can be provided that make it possible to easily collect an offcut by segmenting, instead of rolling up, the offcut, and thereby reduce the amount of offcut generated and reduce the manufacturing cost.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiments of a cutting device and a sheet material manufacturing method of the present disclosure will be described below with reference to the drawings.

Embodiment 1

Figure 1:
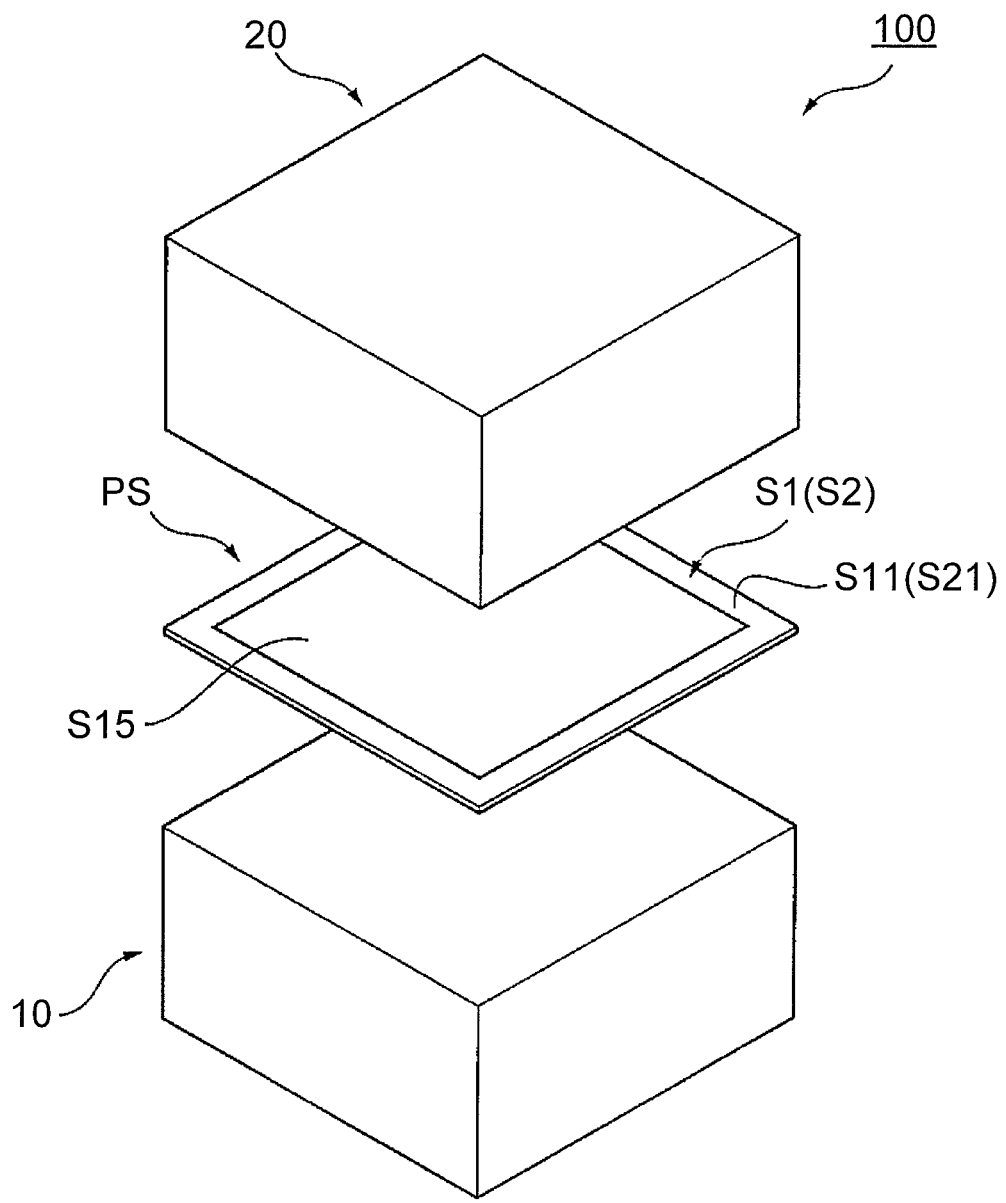
FIG. 1 is a schematic view of a cutting device according to Embodiment 1 of the present disclosure.
Figure 2:
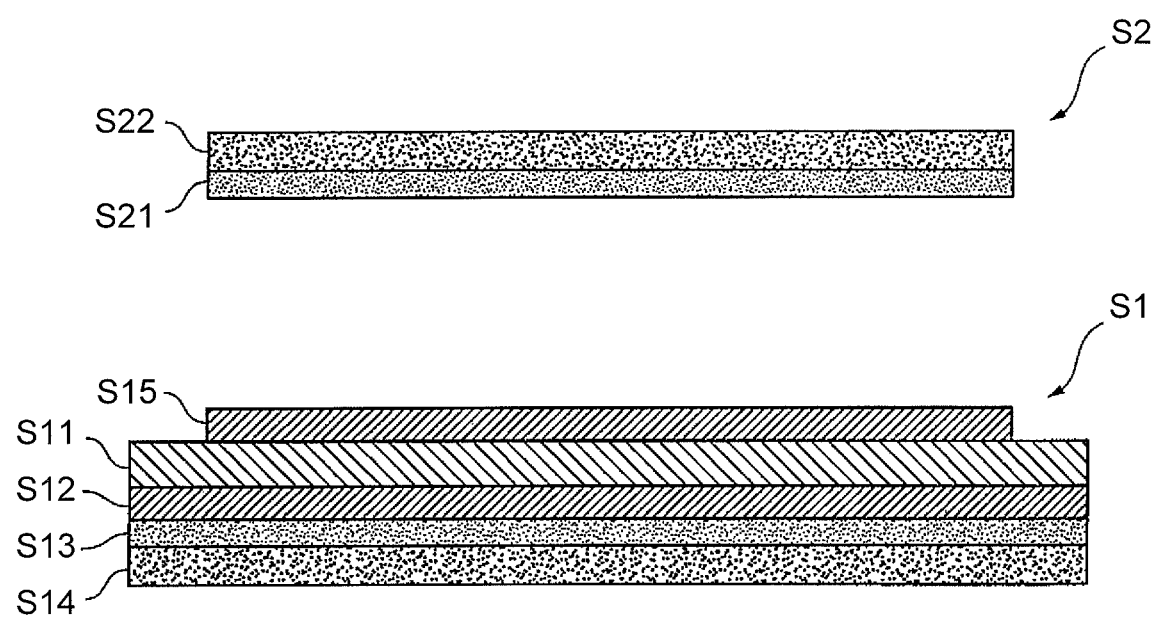
FIG. 2 is a sectional view showing an example of sheet materials to be cut by the cutting device shown in FIG. 1.

FIG. 1 is a schematic view of a cutting device 100 according to Embodiment 1 of the present disclosure. FIG. 2 is a schematic sectional view showing an example of sheet materials S1, S2 to be cut by the cutting device shown in FIG. 1.

The cutting device 100 is a device that includes a lower die 10 and an upper die 20 movable relative to each other and cuts the sheet materials S1, S2 out of a sheet base material PS by shearing. The lower die 10 and the upper die 20 are provided such that the lower die 10 and the upper die 20 can be moved relative to each other, for example, by an appropriate driving mechanism, in a direction of coming closer to each other and in a direction of coming away from each other.

For example, the sheet base material PS is a rectangular sheet stack used to manufacture a membrane electrode assembly (MEA) for a fuel cell, and is conveyed to between the lower die 10 and the upper die 20, for example, by an appropriate conveyor device. The sheet materials S1, S2 cut out of the sheet base material PS are taken out from between the lower die 10 and the upper die 20 by an appropriate conveyor device.

More specifically, for example, the sheet base material PS is a stack in which an anode catalyst layer S12, an anode micro porous layer S13, and an anode gas diffusion layer S14 are stacked in a specific region of one side of a rectangular polymer electrolyte membrane (PEM) S11, and a cathode catalyst layer S15 that is one size smaller than the anode catalyst layer S12 is stacked on the other side of the PEM S11 in a region overlapping the region where the anode catalyst layer S12 is formed.

In this case, the sheet material S1 cut out of the sheet base material PS is a stack of the anode gas diffusion layer S14, the anode micro porous layer S13, the anode catalyst layer S12, the PEM S11, and the cathode catalyst layer S15. Alternatively, the sheet base material PS may be a stack in which a cathode gas diffusion layer S22 is stacked in a specific region of a rectangular cathode micro porous layer S21. In this case, the sheet material S2 cut out of the sheet base material PS is a stack of the cathode micro porous layer S21 and the cathode gas diffusion layer S22. For example, an MEA for a fuel cell can be manufactured by joining together these two types of sheet materials S1, S2.

Figure 3:
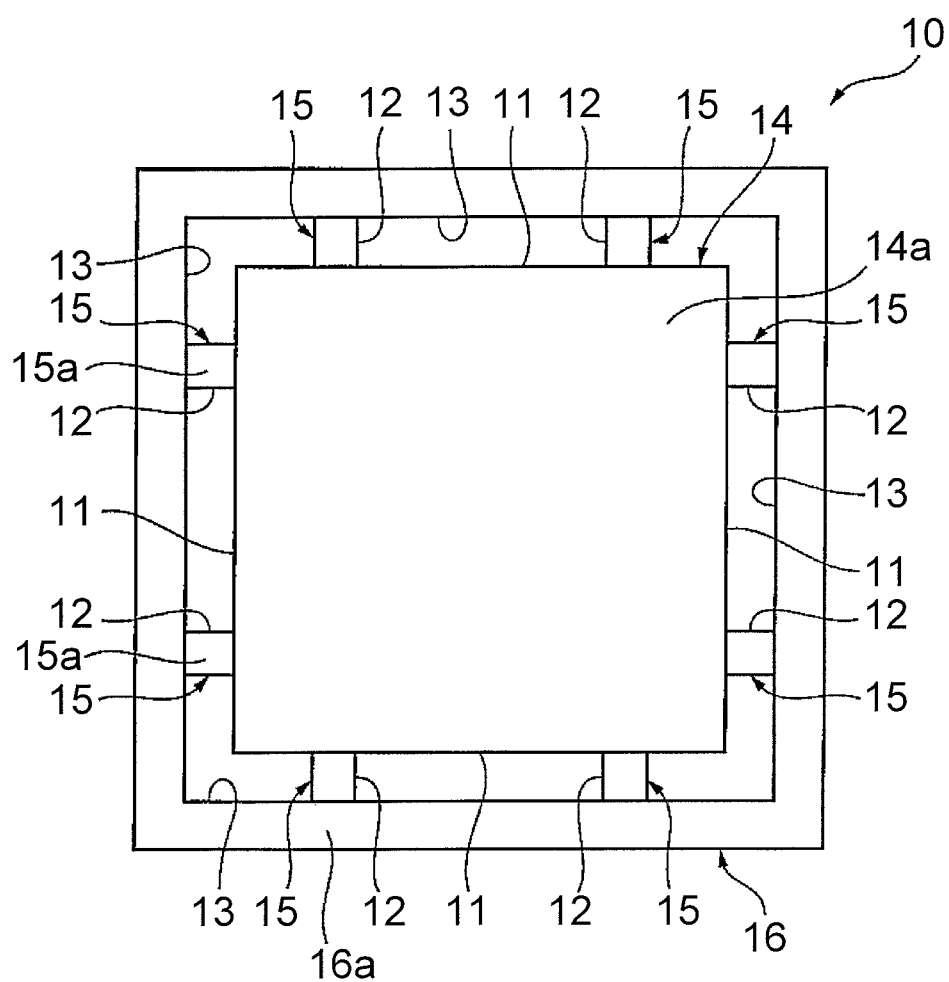
FIG. 3 is a schematic plan view showing an example of a lower die of the cutting device shown in FIG. 1.
Figure 4A:
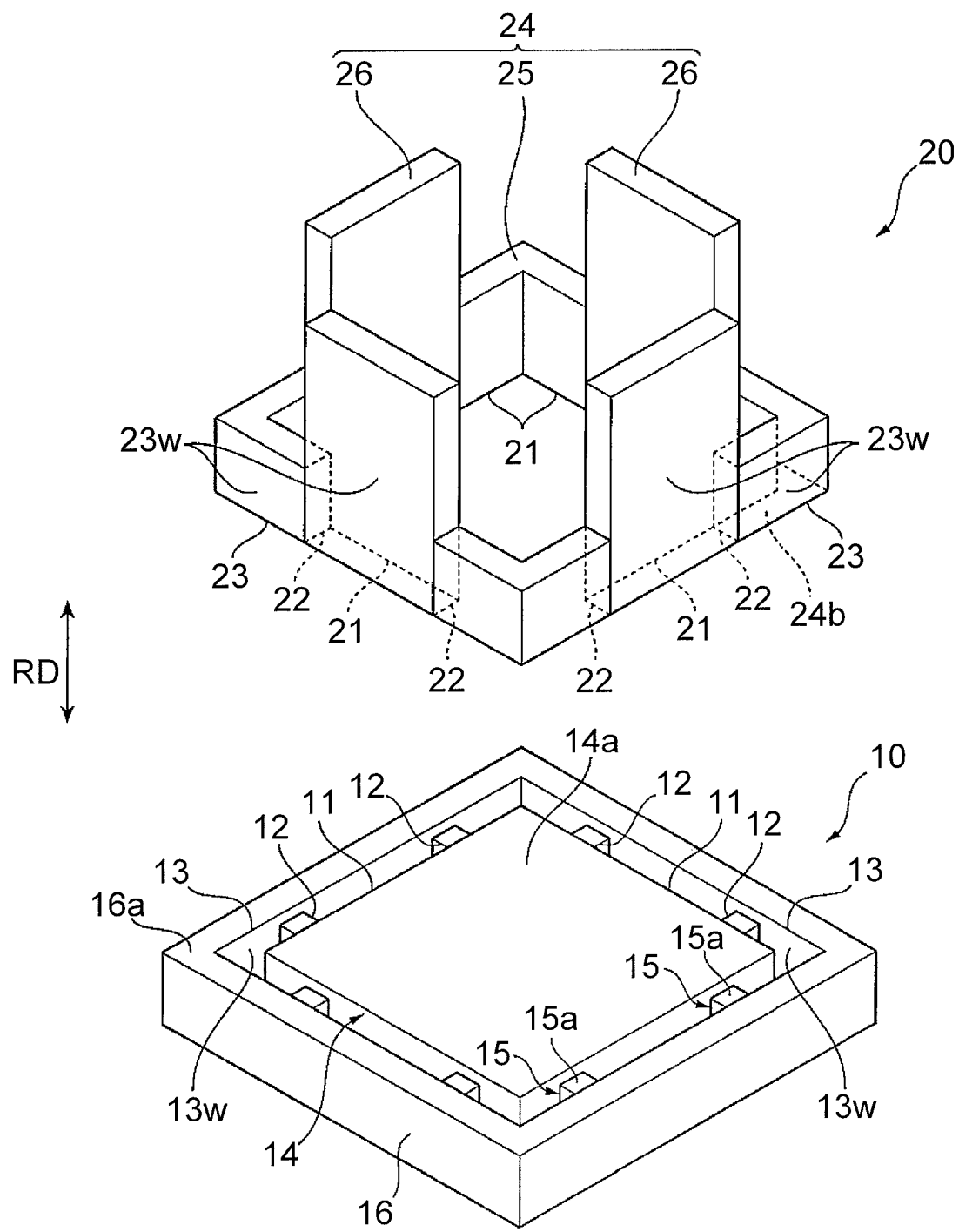
FIG. 4A is a conceptual perspective view showing an example of the lower die and an upper die of the cutting device shown in FIG. 1.
Figure 4B:
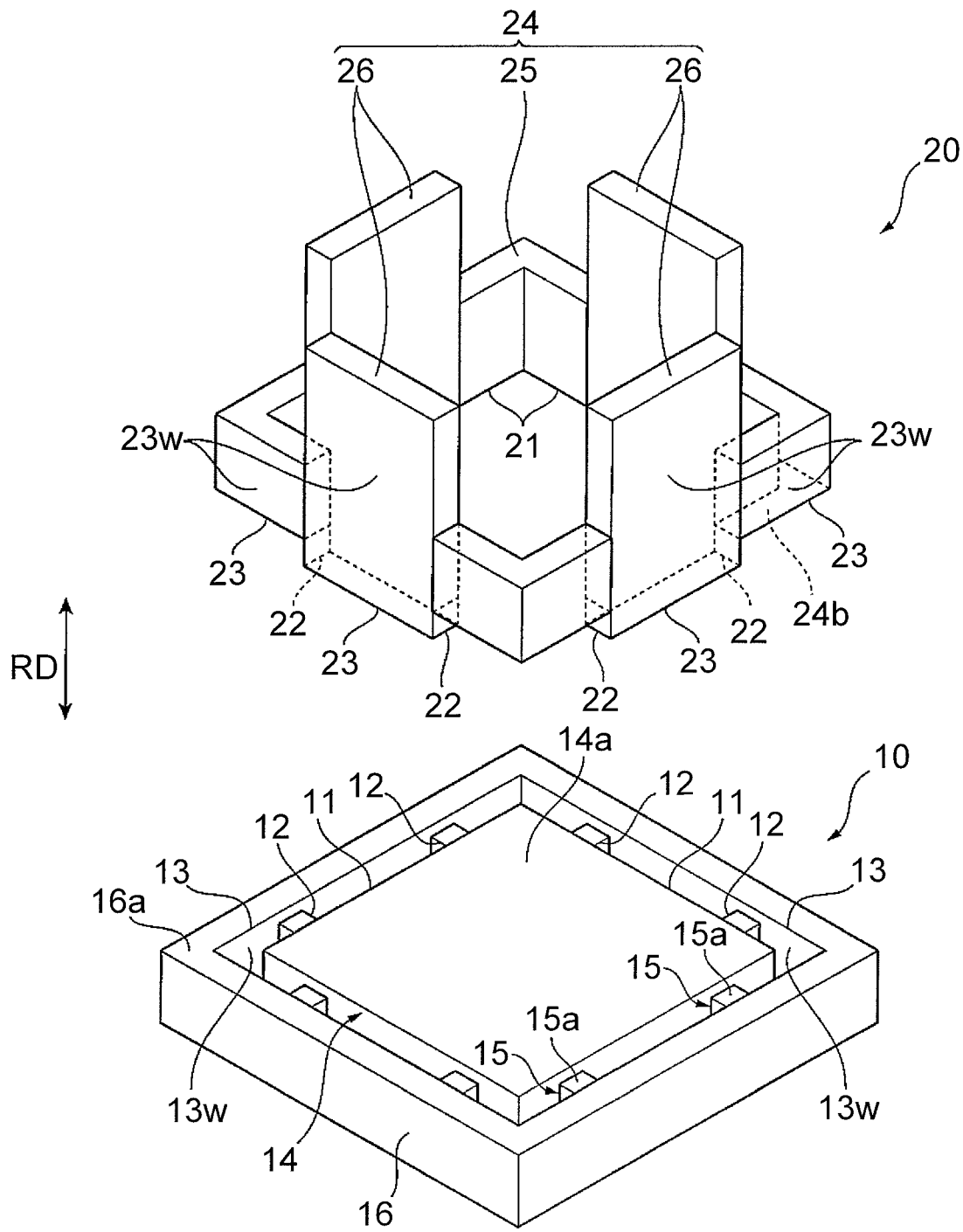
FIG. 4B is a conceptual perspective view showing an example of the lower die and the upper die of the cutting device shown in FIG. 1.

FIG. 3 is a schematic plan view showing an example of the lower die 10 of the cutting device 100 shown in FIG. 1. FIG. 4A and FIG. 4B are conceptual perspective views showing an example of the lower die 10 and the upper die 20 of the cutting device 100 shown in FIG. 1.

As described above, the cutting device 100 is a device that includes the lower die 10 and the upper die 20 movable relative to each other and cuts the sheet material S1 out of the sheet base material PS by shearing. The lower die 10 has a first lower-die edge 11 extending along the outline shape of the sheet material S1, and a plurality of second lower-die edges 12 disposed below the first lower-die edge 11 and each extending in a direction traversing an offcut L (see FIG. 8A) of the sheet base material PS that is left behind after the sheet material S1 is punched out. The upper die 20 has a first upper-die edge 21 which extends along the first lower-die edge 11 and between which and the first lower-die edge 11 the sheet base material PS is shorn to punch out the sheet material S1, and a plurality of second upper-die edges 22 which is provided so as to be protrusible to below the second lower-die edges 12 and between which and the second lower-die edges 12 the offcut L is shorn and divided.

For example, the extension directions of the first lower-die edge 11 and the first upper-die edge 21 are directions substantially orthogonal to a relative movement direction RD of the lower die 10 and the upper die 20. For example, the extension direction of each second lower-die edge 12 is a direction intersecting the extension direction of the first lower-die edge 11 adjacent to that second lower-die edge 12, and for example, is a direction orthogonal to the extension direction of the first lower-die edge 11 adjacent to that second lower-die edge 12. The extension direction of each second upper-die edge 22 is a direction along the extension direction of the second lower-die edge 12 facing that second upper-die edge 22, and for example, is a direction parallel to the extension direction of the second lower-die edge 12 facing that second upper-die edge 22. For example, the extension directions of the second lower-die edges 12 and the second upper-die edges 22 are directions substantially orthogonal to the relative movement direction RD of the lower die 10 and the upper die 20.

More specifically, for example, the lower die 10 has a support part 14 that supports the sheet material S1 punched out of the sheet base material PS. An outer edge of an upper end surface 14a of the support part 14 of the lower die 10 forms the first lower-die edge 11. The upper die 20 has a frame-shaped part 24 that is provided so as to surround the first lower-die edge 11. An inner edge of a lower end surface 24b of the frame-shaped part 24 of the upper die 20 forms the first upper-die edge 21. For example, the support part 14 of the lower die 10 has a prism shape with the upper end surface 14a having a rectangular shape corresponding to the shape of the sheet material S1. For example, the frame-shaped part 24 of the upper die 20 has a rectangular frame shape or a rectangular tubular shape corresponding to the shape of the support part 14 of the lower die 10, and has a space on an inner side of the frame-shaped part 24 in which the support part 14 is snugly fitted.

For example, the lower die 10 has a third lower-die edge 13 extending so as to surround the first lower-die edge 11. The upper die 20 has a third upper-die edge 23 extending along the third lower-die edge 13. For example, the extension directions of the third lower-die edge 13 and the third upper-die edge 23 are directions substantially orthogonal to the relative movement direction RD of the lower die 10 and the upper die 20. When protruded downward, the second upper-die edges 22 are inserted into a clearance between the first lower-die edge 11 and the third lower-die edge 13 such that a frame-shaped offcut Lf is shorn and segmented between the second upper-die edges 22 and the second lower-die edges 12.

More specifically, for example, the lower die 10 has a plurality of bridges 15 each extending in a direction intersecting the extension direction of the first lower-die edge 11 located above that bridge 15, and an outer peripheral part 16 surrounding the support part 14. Side edges, facing each other, of upper end surfaces 15a of a pair of bridges 15 facing each other in the extension direction of the first lower-die edge 11 form the second lower-die edges 12. An inner edge of an upper end surface 16a of the outer peripheral part 16 of the lower die 10 forms the third lower-die edge 13. The frame-shaped part 24 of the upper die 20 is composed of a main body 25 and protrusible parts 26, and an inner edge and an outer edge of the lower end surface 24b of the main body 25 form the first upper-die edge 21 and the third upper-die edge 23, respectively. The protrusible parts 26 of the frame-shaped part 24 are provided so as to be protrusible to below the main body 25, and when protruded, are each inserted between a pair of bridges 15 that are adjacent to each other, and both end edges of a lower end surface of each protrusible part 26 in the extension direction of the first upper-die edge 21 and the third upper-die edge 23 form the second upper-die edges 22.

Figure 5:
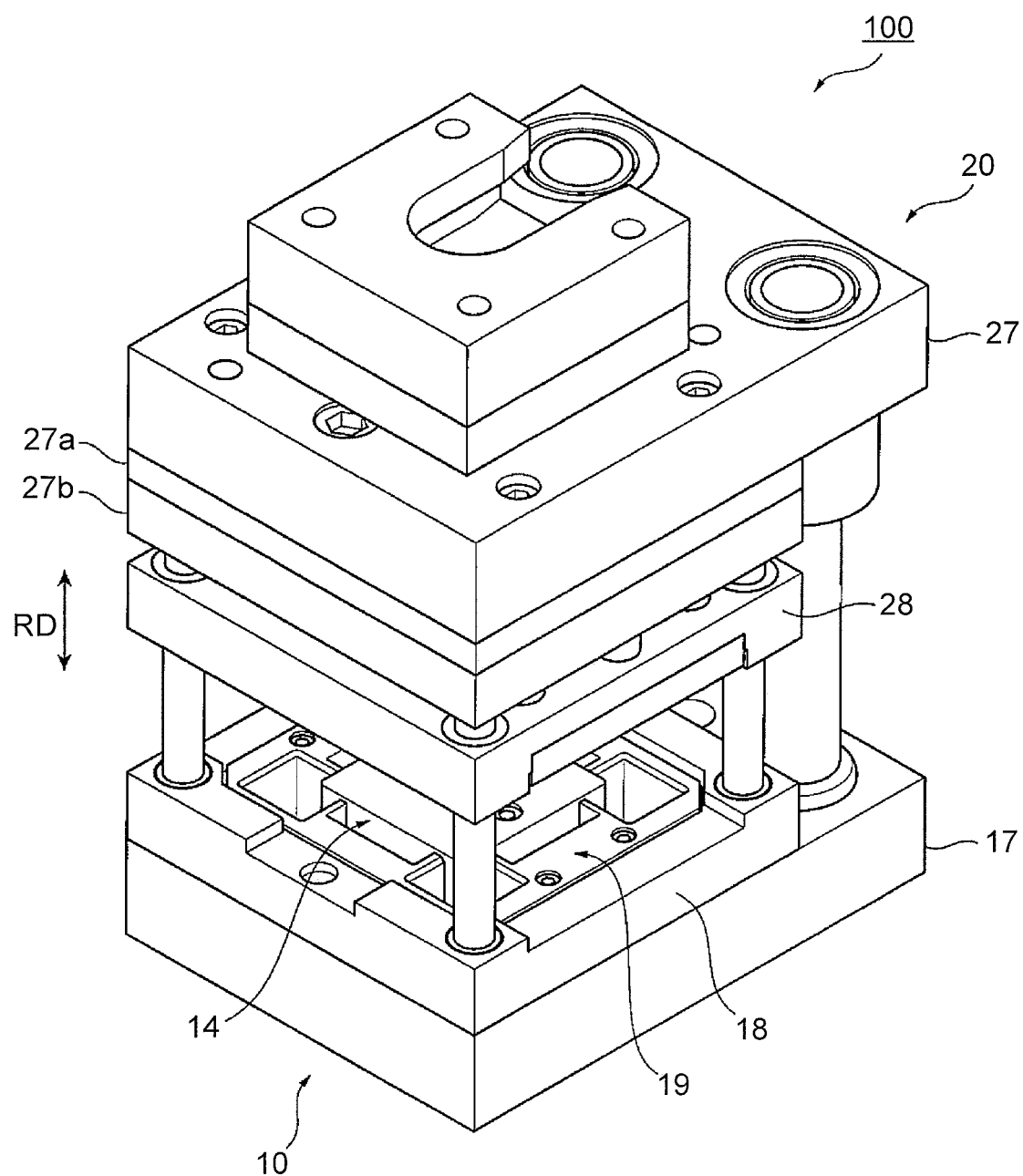
FIG. 5 is a perspective view showing a specific example of the cutting device shown in FIG. 1.
Figure 6A:
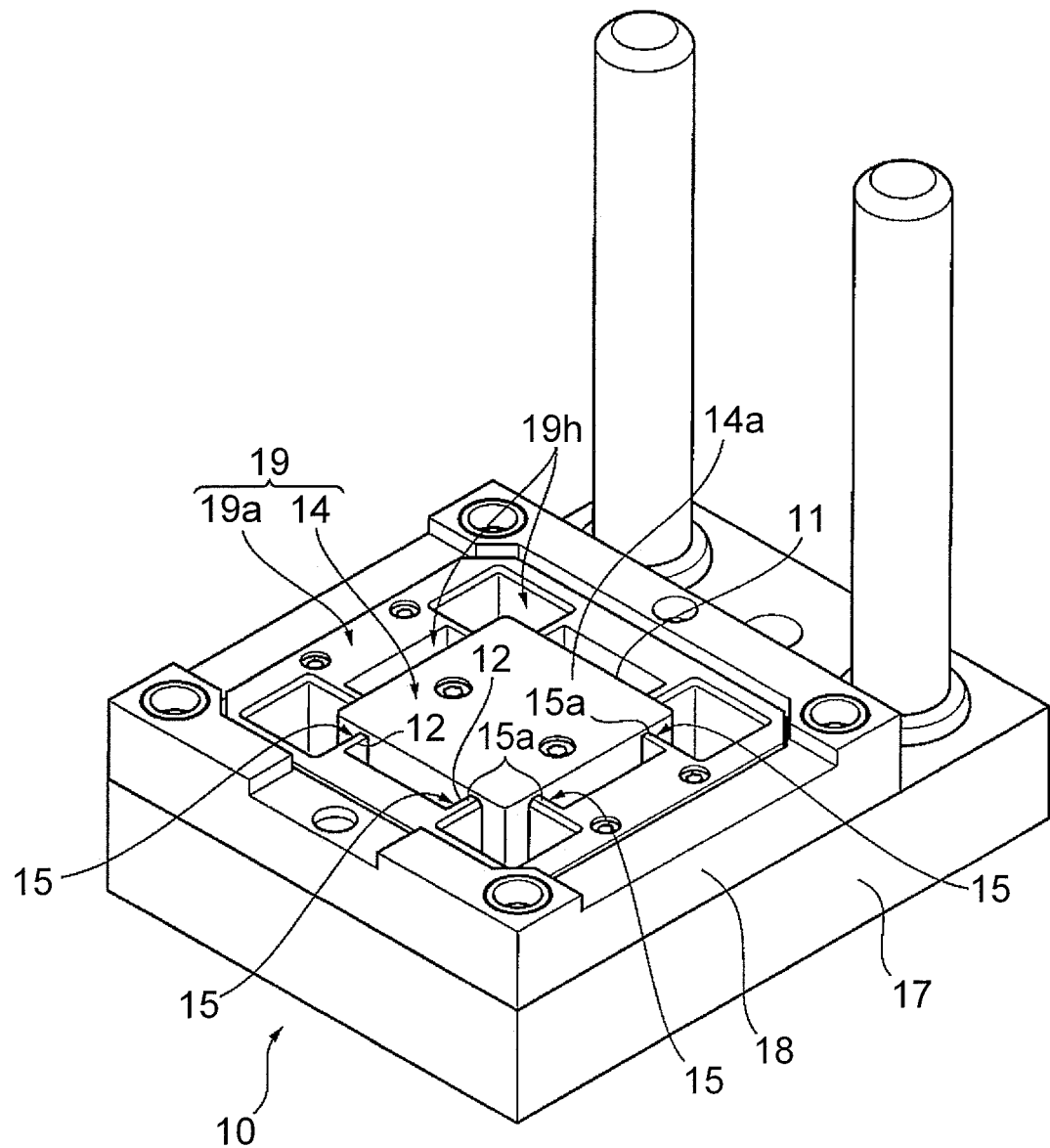
FIG. 6A is a perspective view of an upper surface side of the lower die of the cutting device shown in FIG. 5.
Figure 6B:
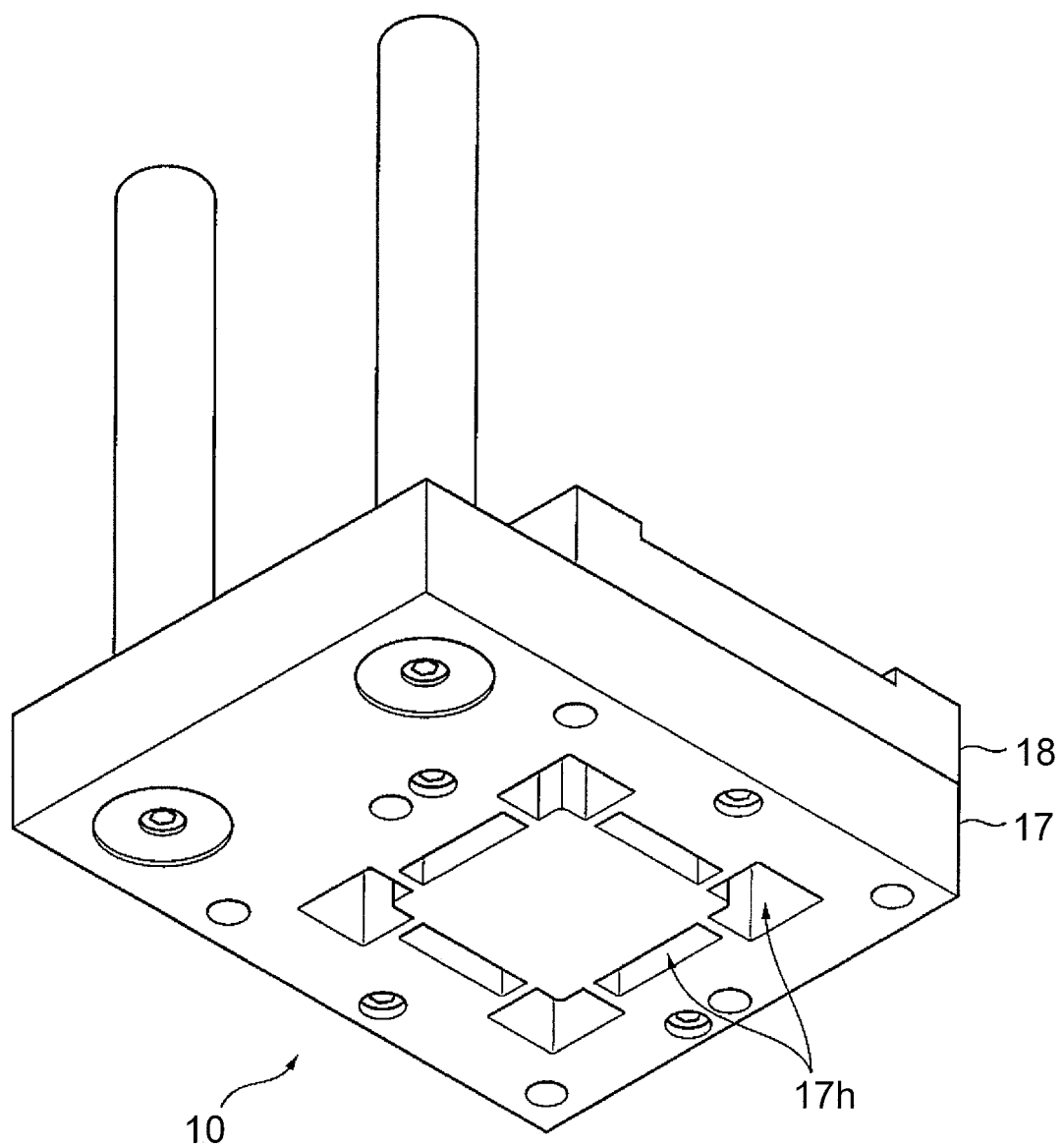
FIG. 6B is a perspective view of a bottom surface side of the lower die of the cutting device shown in FIG. 5.
Figure 7A:
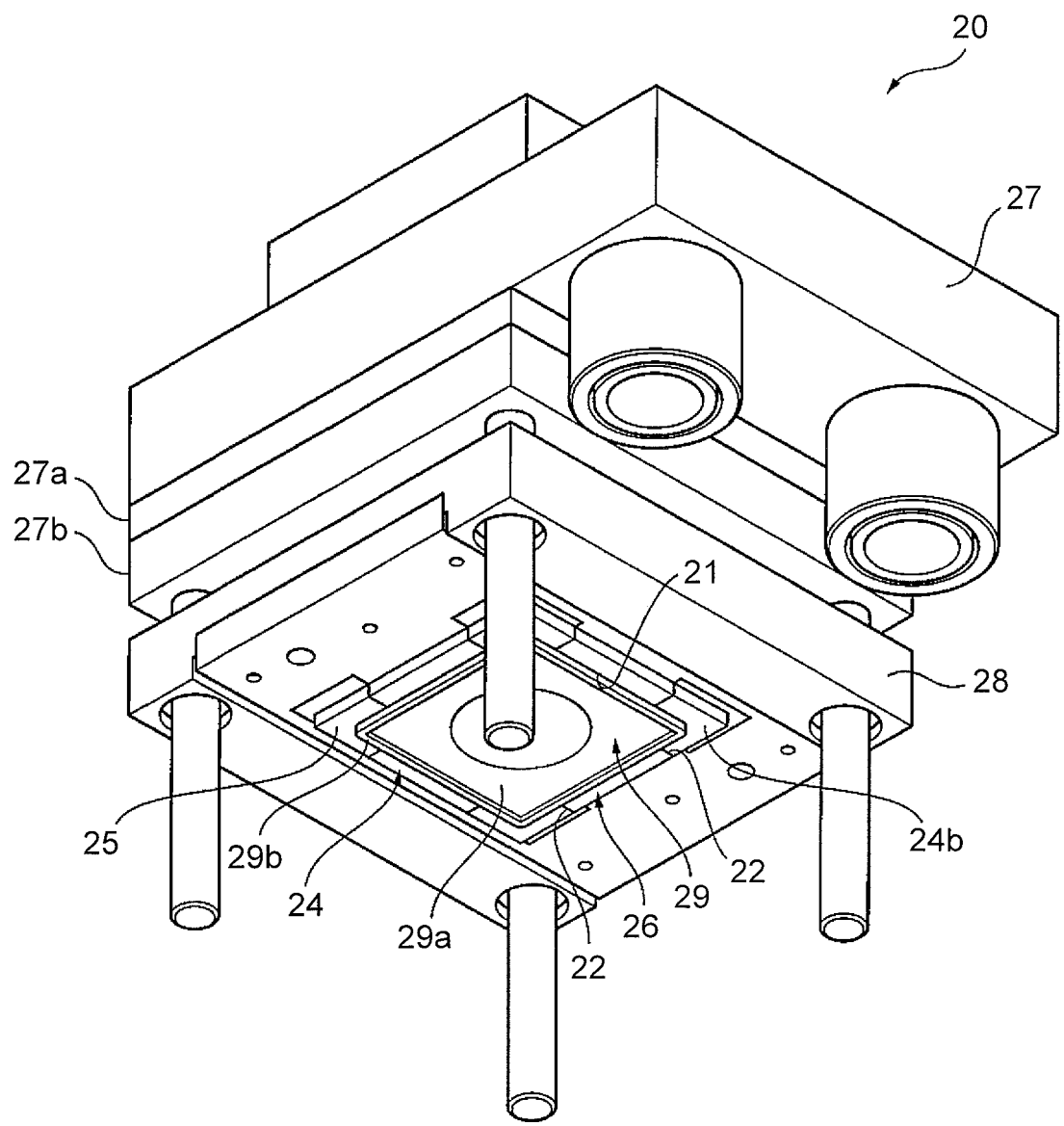
FIG. 7A is a perspective view of a lower surface side of the upper die of the cutting device shown in FIG. 5.
Figure 7B:
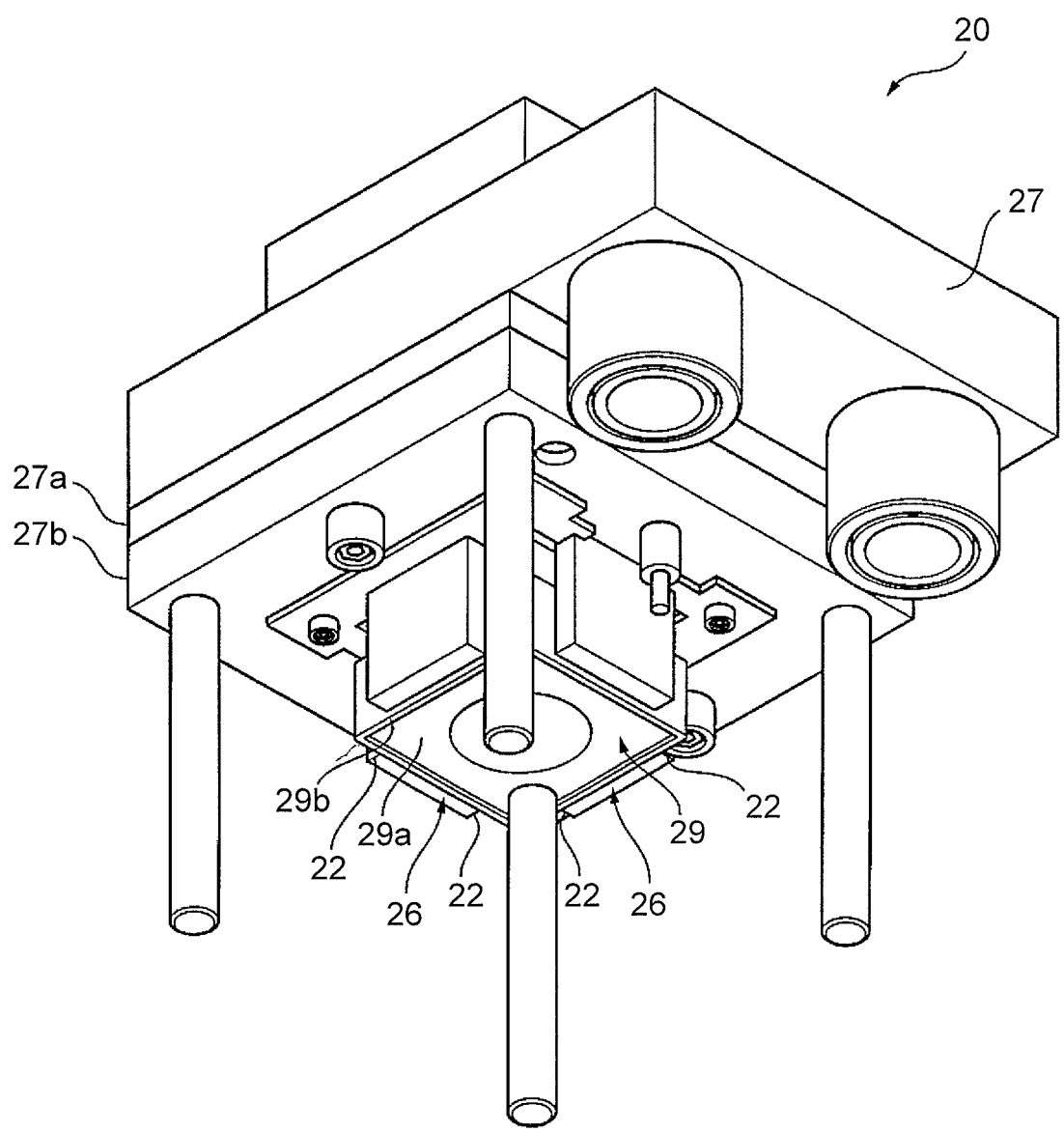
FIG. 7B is a perspective view illustrating the structure of the upper die shown in FIG. 7A.

FIG. 5 is a perspective view showing a specific example of the cutting device 100 shown in FIG. 1. FIG. 6A is a perspective view of an upper surface side of the lower die 10 of the cutting device 100 shown in FIG. 5. FIG. 6B is a perspective view of a bottom surface side of the lower die 10 of the cutting device 100 shown in FIG. 5. FIG. 7A is a perspective view of a lower surface side of the upper die 20 of the cutting device 100 shown in FIG. 5. FIG. 7B is a perspective view illustrating the structure of the upper die 20 shown in FIG. 7A.

The cutting device 100 shown in FIG. 5, FIG. 6A, FIG. 6B, FIG. 7A, and FIG. 7B is a more specific representation of the cutting device 100 shown in the conceptual perspective views of FIG. 3, FIG. 4A, and FIG. 4B. The cutting device 100 shown in FIG. 5 is an example of a device that cuts the rectangular sheet material S1, one size smaller than the sheet base material PS having a rectangular sheet shape as shown in FIG. 1, out of the sheet base material PS. In this case, the lower die 10 of the cutting device 100 need not have the outer peripheral part 16 shown in FIG. 3.

As shown in FIG. 6A, for example, the lower die 10 has a plate-shaped lower die set 17, a rectangular frame-shaped die holder 18 incorporated in the lower die set 17, and a die 19 incorporated on an inner side of the die holder 18. The die 19 of the lower die 10 has the support part 14 as a first die that is disposed at a central part and cuts the sheet material S1 out of the sheet base material PS and supports the sheet material S1, and a second die 19a that is disposed around the support part 14 and supports the offcut L of the sheet base material PS.

The support part 14 as the first die of the lower die 10 has a substantially quadrangular prism shape, and the outer edge of the rectangular upper end surface 14a of the support part 14 forms the first lower-die edge 11 that extends along the outline shape of the sheet material S1 to be punched out of the sheet base material PS. An upper end surface of the second die 19a of the lower die 10 is located below the upper end surface 14a of the support part 14 as the first die. The second die 19a of the lower die 10 has the bridges 15 each extending in the direction intersecting the extension direction of the first lower-die edge 11 of the support part 14 located above that bridge 15. Side edges, facing each other, of the upper end surfaces 15a of each pair of bridges 15 facing each other in the extension direction of the first lower-die edge 11 of the support part 14 form the second lower-die edges 12.

The die 19 of the lower die 10 has holes 19h which are provided between each pair of bridges 15 facing each other in the extension direction of the first lower-die edge 11 and at four corners of the support part 14, and through which the offcut L of the sheet base material PS left behind after the sheet material S1 is punched out falls. As shown in FIG. 6B, the holes 19h communicate with holes 17h which are provided in the lower die set 17 and through which the segmented offcut L falls.

As shown in FIG. 7A, for example, the upper die 20 has a plate-shaped upper die set 27, a punch holder 27b mounted on the upper die set 27 through a back plate 27a, and the frame-shaped part 24 as a punch held by the punch holder 27b. For example, the upper die 20 further has a stripper plate 28 provided around the frame-shaped part 24, and a guide 29 as a punch guide disposed on the inner side of the frame-shaped part 24.

The frame-shaped part 24 as the punch is composed of the main body 25 and the protrusible parts 26, and the inner edge of the lower end surface 24b of the main body 25 forms the first upper-die edge 21. Like the protrusible parts 26 shown in FIG. 4A and FIG. 4B, the protrusible parts 26 are provided so as to be protrusible to below the main body 25, and when protruded, are each inserted between a pair of bridges 15 that are adjacent to each other, and both end edges of the lower end surface of each protrusible part 26 that intersect the extension direction of the first upper-die edge 21 form the second upper-die edges 22.

FIG. 7B shows a state where the stripper plate 28 and the main body 25 of the frame-shaped part 24 of the upper die 20 shown in FIG. 7A are removed. The upper die 20 includes, on the inner side of the frame-shaped part 24, a guide 29 which guides movement of the frame-shaped part 24 and between which and the support part 14 of the lower die 10 the cut sheet material S1 is sandwiched. An inner side of a peripheral edge of a lower end surface 29a of the guide 29 is recessed, and thus the guide 29 has a raised portion 29b that is provided at the peripheral edge of the lower end surface 29a and protrudes downward.

In the following, the sheet material manufacturing method according to Embodiment 1 of the present disclosure will be described.

Figure 8A:
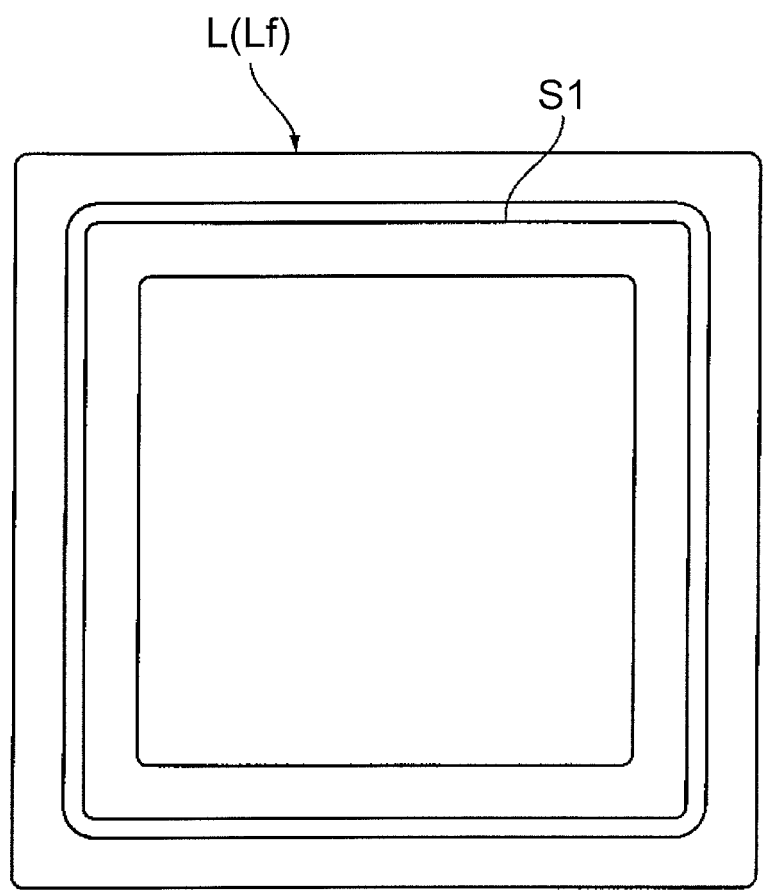
FIG. 8A is a plan view showing an example of the sheet material and an offcut.
Figure 8B:
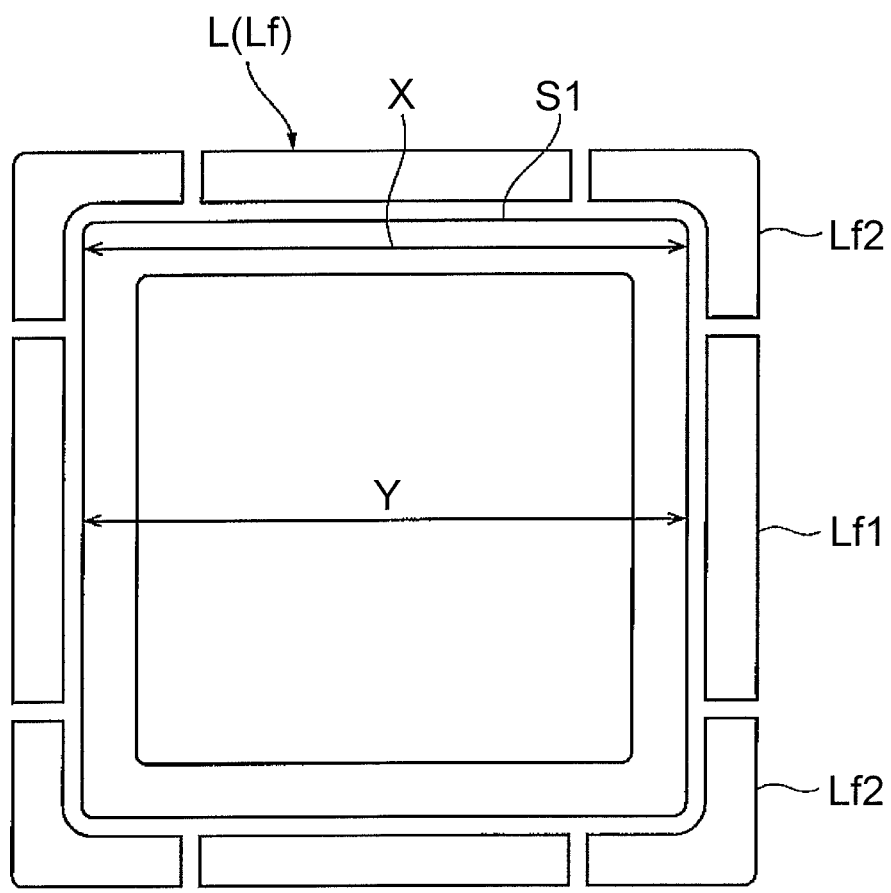
FIG. 8B is a plan view showing an example of the sheet material and the offcut.
Figure 9A:
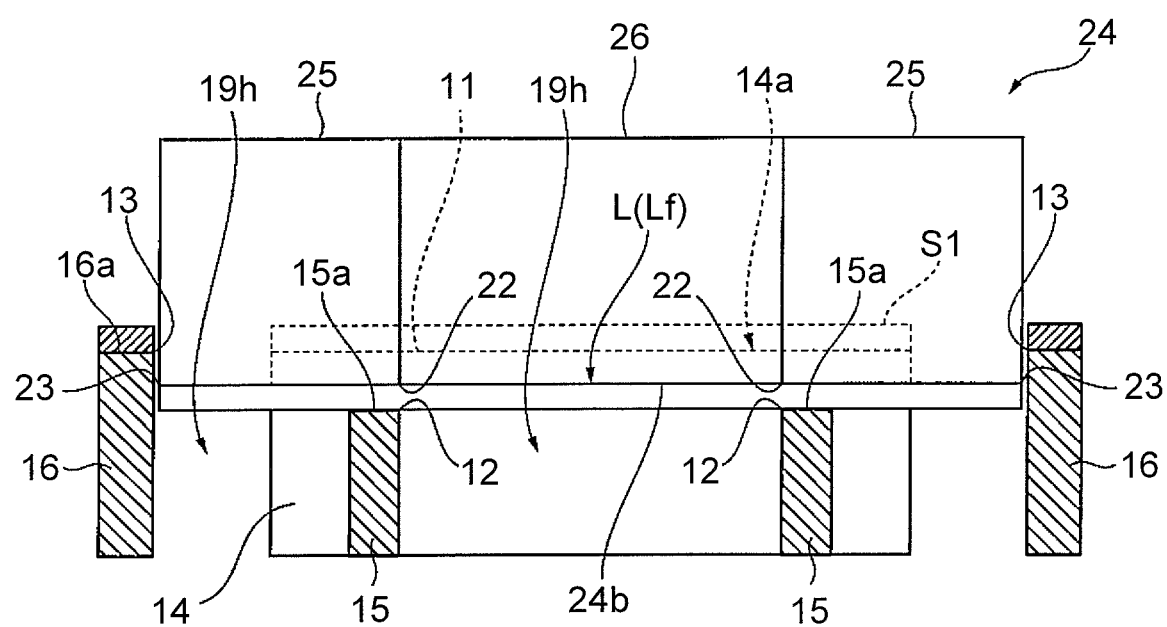
FIG. 9A is a sectional view of the sheet material and the offcut corresponding to FIG. 8A.
Figure 9B:
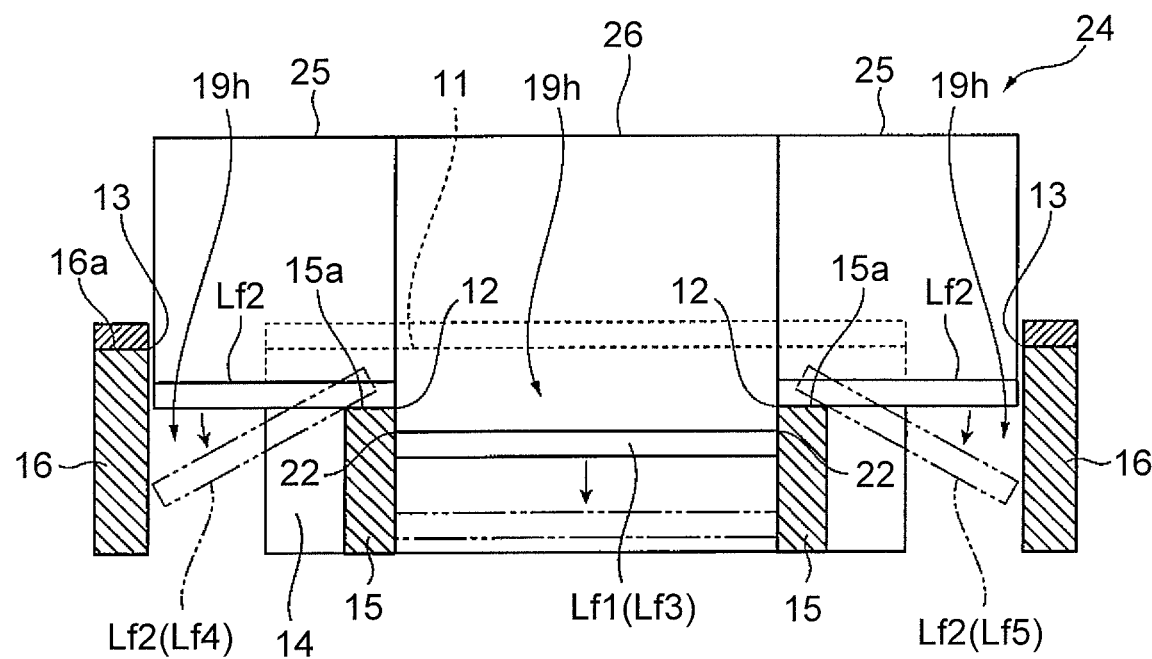
FIG. 9B is a sectional view of the sheet material and the offcut corresponding to FIG. 8B.

FIG. 8A and FIG. 8B are plan views showing an example of the sheet material S1 and the offcut L cut by the sheet material manufacturing method according to Embodiment 1 of the present disclosure. FIG. 9A is a sectional view of the sheet material S1 and the offcut L corresponding to FIG. 8A, and FIG. 9B is a sectional view of the sheet material S1 and the offcut L corresponding to FIG. 8B.

The manufacturing method of the sheet material S1 of this embodiment is a method in which the sheet material S1 is manufactured by cutting the sheet material S1 out of the sheet base material PS by shearing using the lower die 10 and the upper die 20 that are movable relative to each other. For example, this manufacturing method can be implemented by using the cutting device 100. The manufacturing method of the sheet material S1 has a cutting step of punching out the sheet material S1 by shearing the sheet base material PS between the first lower-die edge 11 extending along the outline shape of the sheet material S1 and the first upper-die edge 21 extending along the first lower-die edge 11. This cutting step further includes an offcut segmenting step. The offcut segmenting step is a step of shearing and segmenting the offcut L (frame-shaped offcut Lf) of the sheet base material PS that is left behind after the sheet material S1 is punched out, between the second upper-die edges 22 and the second lower-die edges 12 that is provided below the first lower-die edge 11, by protruding the second upper-die edges 22 to below the second lower-die edges 12.

To cut the sheet material S1 out of the sheet base material PS by the cutting device 100 in the cutting step, first, the sheet base material PS is disposed between the lower die 10 and the upper die 20 in a state where the lower die 10 and the upper die 20 are released and separated from each other. For example, as shown in FIG. 1, the rectangular sheet base material PS is conveyed and disposed on the upper end surface 14a of the support part 14 of the lower die 10. At this point, the outer edge of the rectangular sheet base material PS is disposed so as to protrude to the outer side of the outer edge of the upper end surface 14a of the support part 14 of the lower die 10 but lie on the inner side of the inner edge of the outer peripheral part 16 of the lower die 10, with a slight clearance left to the inner edge.

In this state, the lower die 10 and the upper die 20 are moved relative to each other such that the lower die 10 and the upper die 20 come closer to each other, and the sheet base material PS is sandwiched between the first lower-die edge 11 extending along the outline shape of the sheet material S1 to be punched out of the sheet base material PS and the first upper-die edge 21 extending along the first lower-die edge 11. More specifically, in the state where the sheet base material PS is disposed between the lower die 10 and the upper die 20, the lower die 10 and the upper die 20 are moved relative to each other such that the frame-shaped part 24 of the upper die 20 comes closer to the support part 14 of the lower die 10, and the sheet base material PS is sandwiched between the upper end surface 14a of the support part 14 of the lower die 10 and the lower end surface 24b of the frame-shaped part 24 of the upper die 20. When the upper die 20 has the guide 29 as shown in FIG. 7A, the sheet base material PS is sandwiched between the guide 29 of the upper die 20 and the support part 14 of the lower die 10.

In this state, the lower die 10 and the upper die 20 are further moved relative to each other in the direction of coming closer to each other. More specifically, the frame-shaped part 24 of the upper die 20 and the support part 14 of the lower die 10 are moved relative to each other until the upper end surface 14a of the support part 14 of the lower die 10 enters to the inner side of the inner edge of the lower end surface 24b of the frame-shaped part 24 of the upper die 20 and the lower end surface 24b of the frame-shaped part 24 of the upper die 20 is located below the upper end surface 14a of the support part 14 of the lower die 10. Thus, a shear stress is exerted on the sheet base material PS sandwiched between the first lower-die edge 11 provided at the outer edge of the upper end surface 14a of the support part 14 and the first upper-die edge 21 provided at the inner edge of the lower end surface 24b of the frame-shaped part 24, to thereby shear the sheet base material PS between the first lower-die edge 11 and the first upper-die edge 21 and punch the sheet material S1 out of the sheet base material PS.

Here, as described above, the frame-shaped part 24 of the upper die 20 is composed of the main body 25 and the protrusible parts 26. The protrusible parts 26 are each disposed between portions of the main body 25 so as to be movable to below the main body 25, and are provided so as to be protrusible to below the main body 25. However, as shown in FIG. 4A and FIG. 7A, in a state where the protrusible parts 26 are not protruded to below the main body 25, the lower end surface of the main body 25 and the lower end surfaces of the protrusible parts 26 are flush without a level difference therebetween.

In this state, the first upper-die edge 21 that is continuous in a circumferential direction at the inner edge of the lower end surface 24b of the frame-shaped part 24 is formed by an edge that is an inner edge of the lower end surface of the main body 25 and edges that are inner edges of the lower end surfaces of the protrusible parts 26 between portions of the main body 25. Thus, in the state where the protrusible parts 26 are not protruded to below the main body 25, the lower end surface 24b of the frame-shaped part 24 of the upper die 20 can be moved to below the upper end surface 14a of the support part 14 of the lower die 10 as shown in FIG. 9A to cut the frame-shaped offcut Lf off the sheet base material PS.

When the upper die 20 has the guide 29 as shown in FIG. 7A, movement of the frame-shaped part 24 of the upper die 20 can be stabilized by the guide 29, and the sheet base material PS can be sandwiched between the guide 29 and the support part 14 to more reliably shear the sheet base material PS. Since the guide 29 has the raised portion 29b that is provided at the peripheral edge of the lower end surface 29a and protrudes downward, an outer edge of the sheet material S1 to be cut out of the sheet base material PS can be more reliably held between the raised portion 29b and the support part 14, and thus the sheet material S1 can be cut more accurately and reliably.

As shown in FIG. 8A and FIG. 9A, the sheet material S1 punched out of the sheet base material PS remains on the first lower-die edge 11, i.e., the upper end surface 14a of the support part 14 of the lower die 10. Meanwhile, the frame-shaped offcut Lf that is the remainder of the sheet base material PS left behind after the sheet material S1 is punched out is separated from the sheet material S1, is moved to below the first lower-die edge 11, and is disposed on the second lower-die edges 12 disposed below the first lower-die edge 11, i.e., on the upper end surfaces 15a of the bridges 15. Moreover, the frame-shaped offcut Lf is sandwiched, below the first lower-die edge 11, between the second lower-die edges 12 provided at the side edges of the upper end surfaces 15a of the bridges 15 and the second upper-die edges 22 provided on the lower end surfaces of the protrusible parts 26 of the frame-shaped part 24.

In the cutting step of the manufacturing method of the sheet material S1 of this embodiment, as shown in FIG. 4A, a wall surface 13w extending downward from the third lower-die edge 13 that extends so as to surround the first lower-die edge 11 may be used to guide a wall surface 23w extending upward from the third upper-die edge 23 that extends along the third lower-die edge 13. Thus, the relative movement of the lower die 10 and the upper die 20 can be stabilized, and the frame-shaped offcut Lf having a rectangular frame shape and the sheet material S1 as shown in FIG. 8A can be more accurately cut out of the rectangular sheet base material PS as shown in FIG. 1 by the first upper-die edge 21 and the first lower-die edge 11 facing each other in the vertical direction.

More specifically, in the state where the sheet base material PS is disposed between the lower die 10 and the upper die 20, the lower die 10 and the upper die 20 are moved relative to each other so as to come closer to each other, and the wall surface extending upward from the third upper-die edge 23 extending along the third lower-die edge 13 that extends so as to surround the first lower-die edge 11 is guided by the wall surface 13w extending downward from the third lower-die edge 13. In this state, the lower die 10 and the upper die 20 are further moved relative to each other in the direction of coming closer to each other. In this way, the sheet base material PS sandwiched between the first lower-die edge 11 and the first upper-die edge 21 as described above is shorn between the first lower-die edge 11 and the first upper-die edge 21 by a shear stress exerted on the sheet base material PS, while displacement of the lower die 10 and the upper die 20 is prevented.

More specifically, the lower end surface 24b of the frame-shaped part 24 of the upper die 20 is inserted into the clearance of the lower die 10 between the upper end surface 16a of the outer peripheral part 16 and the upper end surface 14a of the support part 14, and the sheet base material PS is shorn between the first lower-die edge 11 provided at the outer edge of the upper end surface 14a of the support part 14 and the first upper-die edge 21 provided at the inner edge of the lower end surface 24b of the frame-shaped part 24. Moreover, the wall surface 23w extending upward from the third upper-die edge 23 provided at the outer edge of the lower end surface 24b of the frame-shaped part 24 is guided by the wall surface 13w extending downward from the third lower-die edge 13 provided at the inner edge of the upper end surface 16a of the outer peripheral part 16.

Thus, as shown in FIG. 1, the sheet material S1 is punched out of the rectangular sheet base material PS and the frame-shaped offcut Lf shown in FIG. 8A is cut. The frame-shaped offcut Lf is moved downward, for example, through the clearance between the first lower-die edge 11 and the third lower-die edge 13, i.e.; the clearance between the outer peripheral part 16 and the support part 14 of the lower die 10. Then, as shown in FIG. 9A, the frame-shaped offcut is sandwiched between the second lower-die edges 12 provided at the side edges of the upper end surfaces 15a of the bridges 15 and the second upper-die edges 22 provided on the lower end surfaces of the protrusible parts 26 of the frame-shaped part 24.

As described above, the frame-shaped offcut Lf shown in FIG. 8A is generated when the sheet material S1 is cut out of the sheet base material PS. As shown in FIG. 9A, the frame-shaped offcut Lf is sandwiched between the second lower-die edges 12 provided at the side edges of the upper end surfaces 15a of the bridges 15 and the second upper-die edges 22 provided on the lower end surfaces of the protrusible parts 26 of the frame-shaped part 24. In the cutting step of the manufacturing method of the sheet material S1 of this embodiment, the offcut segmenting step is further performed.

Specifically, in the state where the frame-shaped offcut Lf is sandwiched between the second lower-die edges 12 and the second upper-die edges 22 as shown in FIG. 9A, the second upper-die edges 22 are protruded to below the second lower-die edges 12 as shown in FIG. 9B. More specifically, the lower end surfaces of the protrusible parts 26 of the frame-shaped part 24 of the upper die 20 are protruded to below the lower end surface of the main body 25 and the upper end surfaces 15a of the bridges 15 and each inserted into the clearance between the upper end surfaces 15a of the bridges 15. Then, a shear stress is exerted on the frame-shaped offcut Lf sandwiched between the second lower-die edges 12 located at the side edges, facing each other, of the upper end surfaces 15a of each pair of bridges 15 that are adjacent to each other and the second upper-die edges 22 located at both end edges of the lower end surfaces of the protrusible parts 26.

As a result, as shown in FIG. 8B, the frame-shaped offcut Lf is shorn at a plurality of locations and segmented, for example, into I-shaped small pieces Lf1 and L-shaped small pieces Lf2. As shown in FIG. 9B, of the small pieces Lf1, Lf2 of the segmented frame-shaped offcut Lf, the I-shaped small pieces Lf1 fall into the holes 19h provided between the bridges 15 of the lower die 10 and are collected. As shown in FIG. 9B, of the small pieces Lf1, Lf2 of the segmented frame-shaped offcut Lf, the L-shaped small pieces Lf2 each have both ends lying on the upper end surfaces 15a of the bridges 15 of the lower die 10, but the center of gravity of the L-shaped small piece Lf2 is located at the corner of the L-shape. Therefore, when the lower die 10 and the upper die 20 are released by being moved relative to each other in the direction of coming away from each other, as indicated by the two-dot dashed lines in FIG. 9B, each L-shaped small piece Lf2 turns with both ends serving as support points, falls into the hole 19h of the lower die 10, and is collected.

As has been described above, according to the cutting device 100 and the sheet material manufacturing method of this embodiment, the offcut L of the sheet base material PS can be segmented into the small pieces Lf1, Lf2 immediately after the sheet material S1 is punched out of the sheet base material PS, which can eliminate the need for collecting the offcut L by rolling it up and can thereby facilitate the collection of the offcut L and reduce the manufacturing cost. In particular, when the sheet base material PS is a stack used to manufacture an MEA for a fuel cell and includes two or more of a GDL, MPL, catalyst layer, and PEM, it is possible to reduce the generation amount of the offcut L containing an expensive material, or reduce the amount of expensive material discarded along with the offcut L, or efficiently collect the offcut L, and thereby reduce the manufacturing cost of the fuel cell.

In some cases, the sheet material S1 manufactured by the sheet material manufacturing method of this embodiment has a small projection formed at the outer edge. For example, since the frame-shaped part 24 of the upper die 20 is composed of the main body 25 and the protrusible parts 26, a small projection projecting from the outer edge of the sheet material S1 toward the outer side may be formed at positions corresponding to clearances between the main body 25 and the protrusible parts 26, i.e., positions corresponding to clearances between the I-shaped small pieces Lf1 and the L-shaped small pieces Lf2 of the frame-shaped offcut Lf shown in FIG. 8B. However, such a projection can be limited to a size of, for example, not larger than 20 μm, and more preferably not larger than 5 μm, and therefore does not affect the quality of the sheet material S1. Specifically, as shown in FIG. 8B, tolerances for a dimension X of the sheet material S1 between the L-shaped small pieces Lf2 of the frame-shaped offcut Lf and a dimension Y of the sheet material S1 between the I-shaped small pieces Lf1 of the frame-shaped offcut Lf can be limited to, for example, not larger than 20 μm, and more preferably not larger than 5 μm.

Embodiment 2

In the following, an embodiment of a cutting device according to Embodiment 2 of the present disclosure will be described with reference to FIG. 10, FIG. 11A, FIG. 11B, FIG. 12A, FIG. 12B, FIG. 13, and FIG. 14 and by citing FIG. 9A and FIG. 9B. A cutting device 100A of this embodiment is different from the cutting device 100 of Embodiment 1 in that a lower die 10A has a plurality of support parts 14. Those parts of the cutting device 100A of this embodiment that are the same as in the cutting device 100 of Embodiment 1 will be denoted by the same reference signs while the description thereof will be omitted where appropriate.

Figure 10:
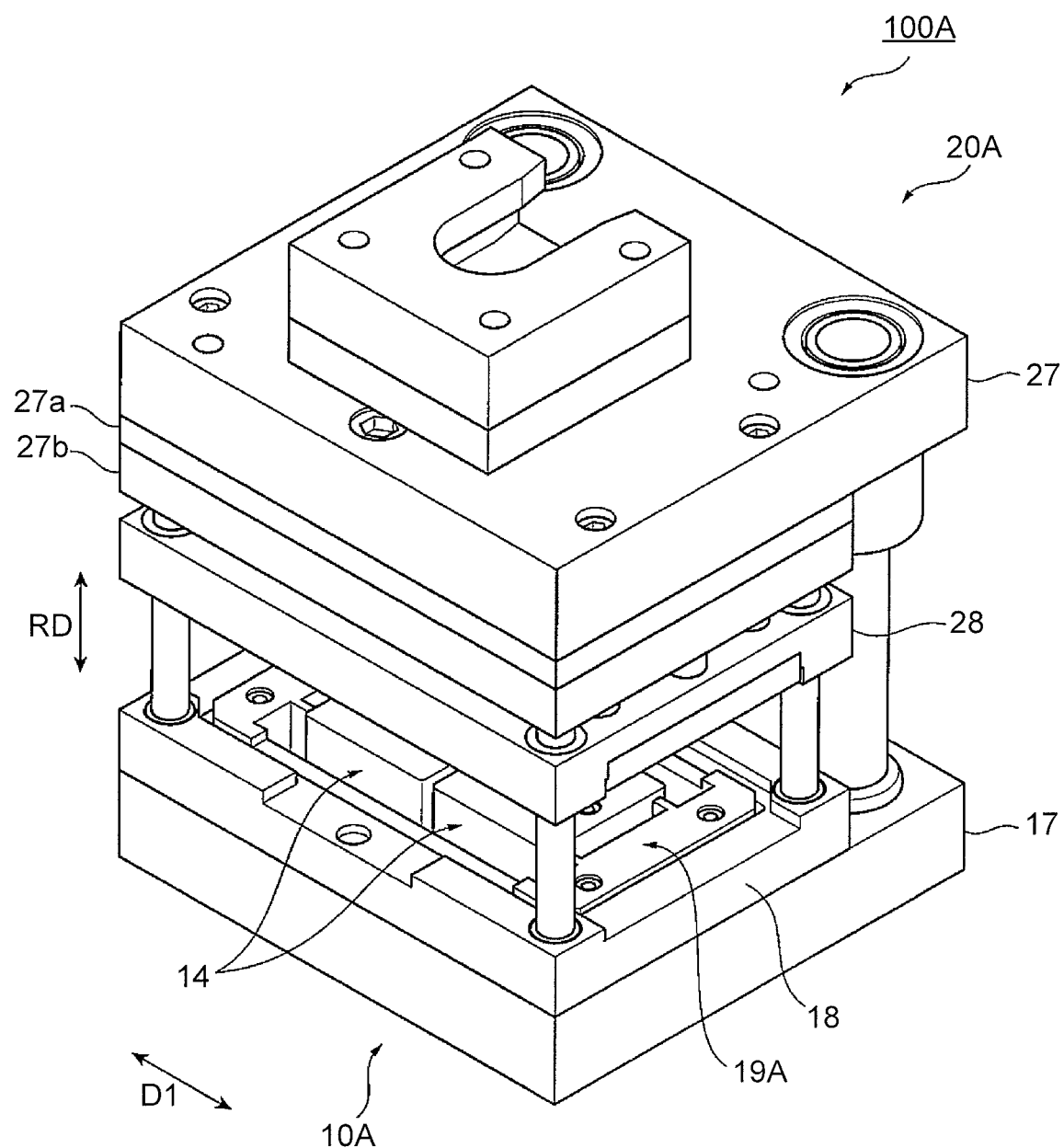
FIG. 10 is a perspective view of a cutting device according to Embodiment 2 of the present disclosure.
Figure 11A:
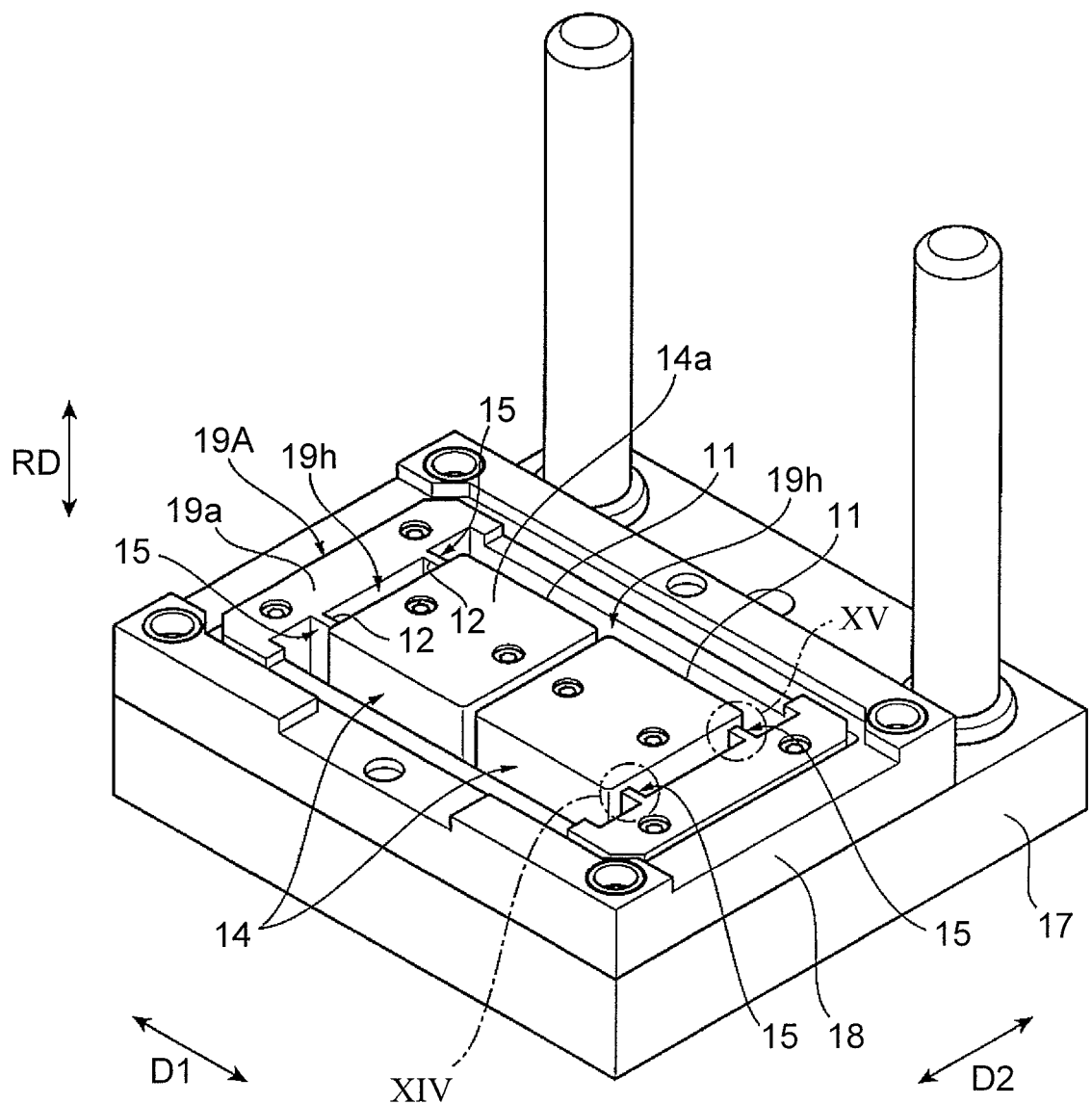
FIG. 11A is a perspective view of an upper surface side of a lower die of the cutting device shown in FIG. 10.
Figure 11B:
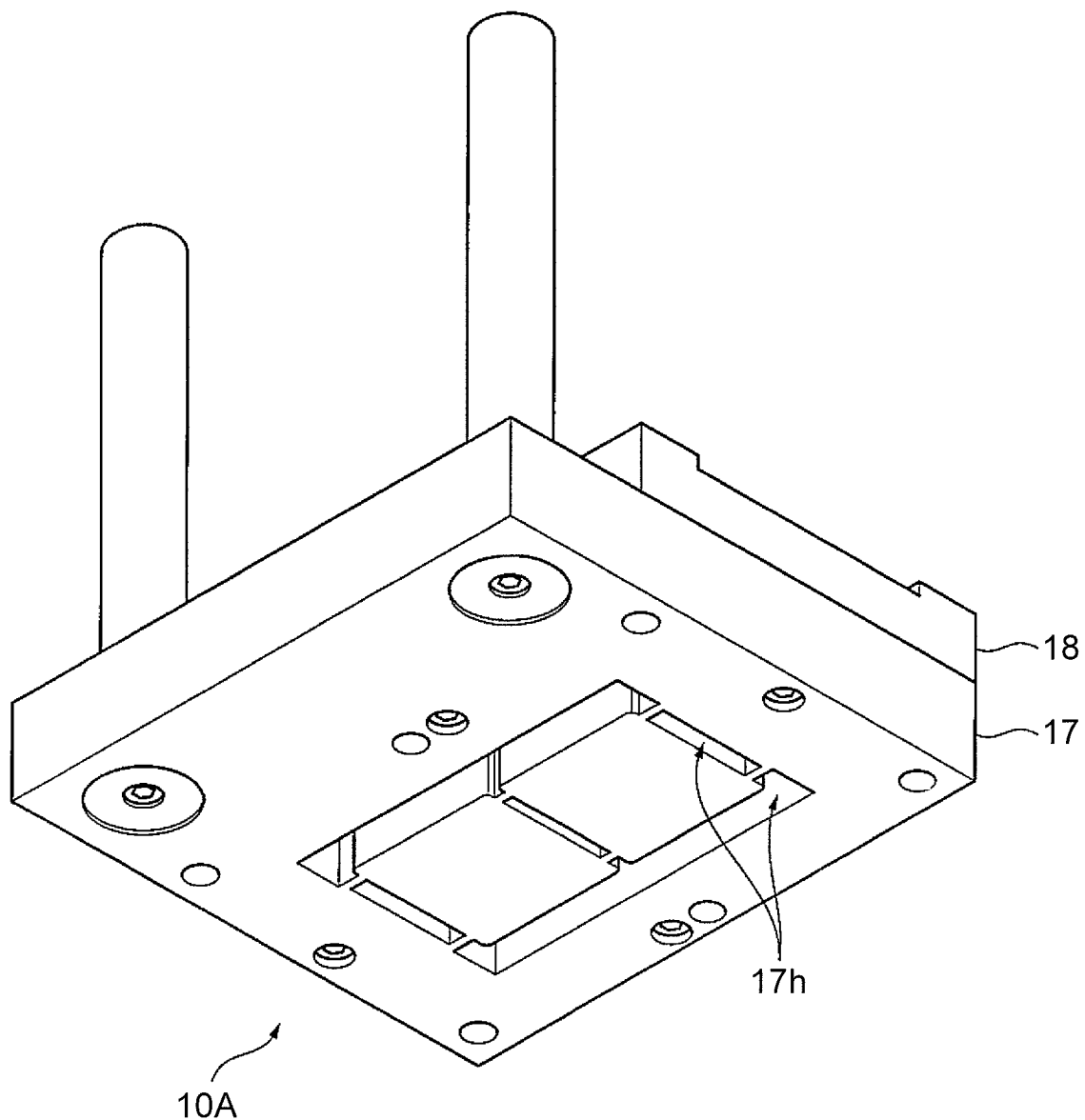
FIG. 11B is a perspective view of a bottom surface side of the lower die of the cutting device shown in FIG. 10.
Figure 12A:
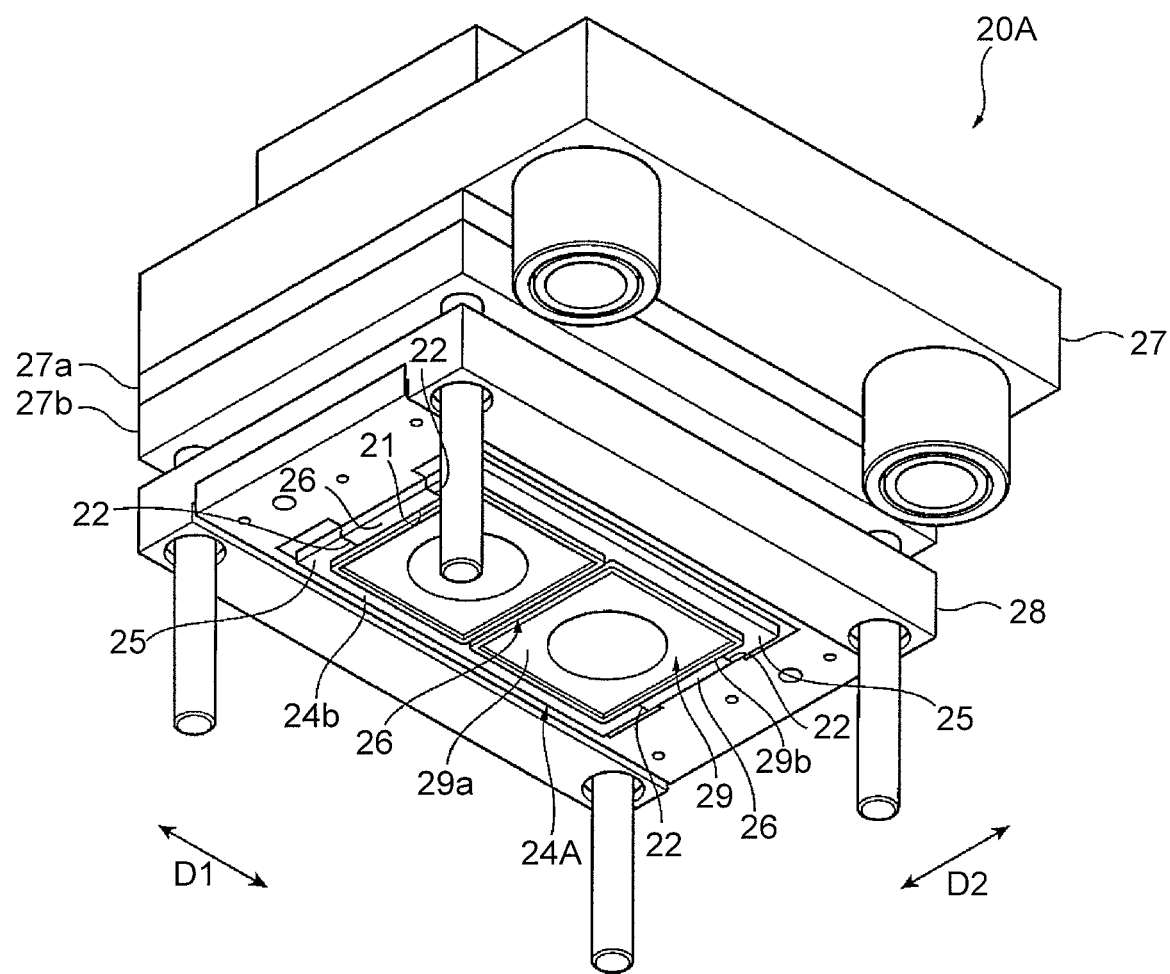
FIG. 12A is a perspective view of a lower surface side of an upper die of the cutting device shown in FIG. 10.
Figure 12B:
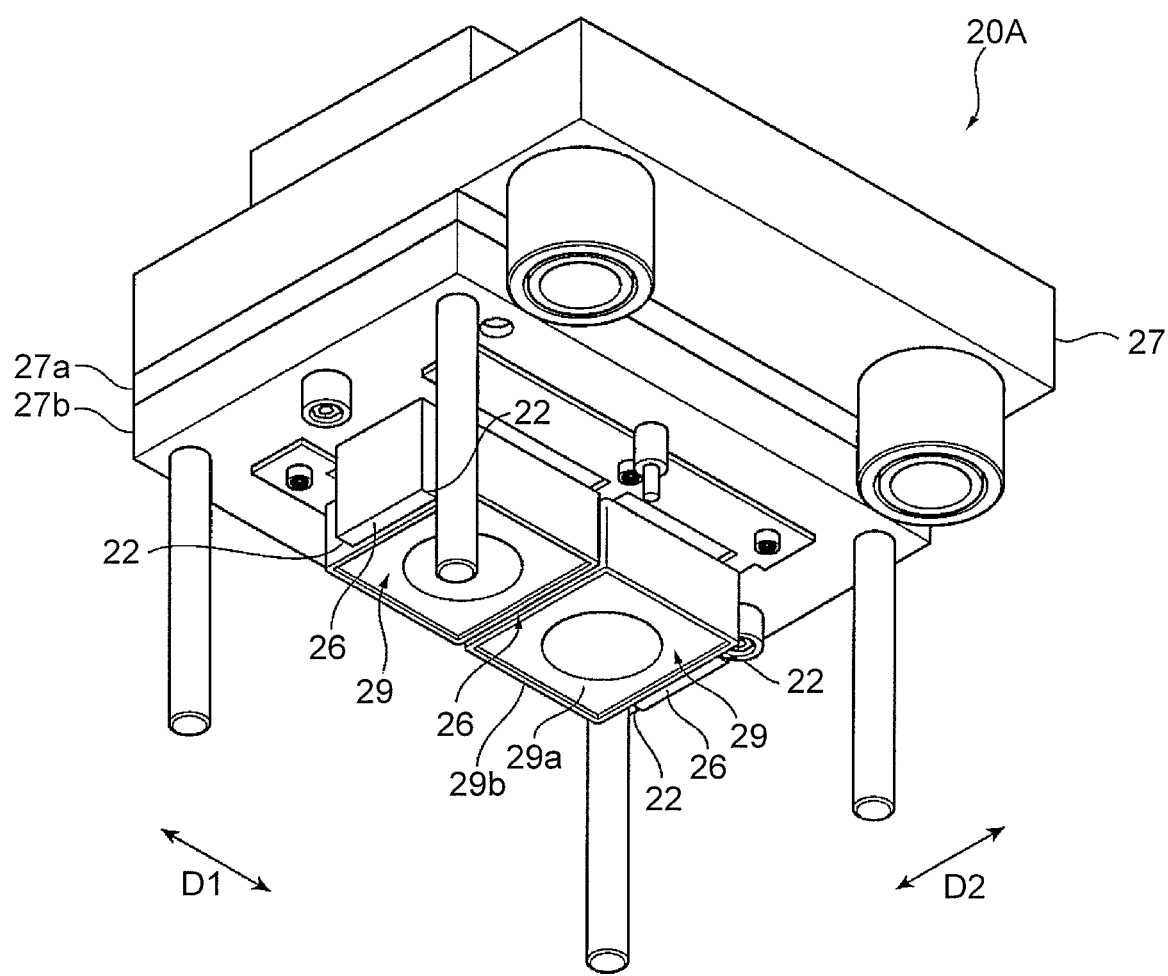
FIG. 12B is a perspective view illustrating the structure of the upper die shown in FIG. 12A.

FIG. 10 is a perspective view of the cutting device 100A according to Embodiment 2 of the present disclosure. FIG. 11A and FIG. 11B are perspective views of an upper surface side and a lower surface side, respectively, of the lower die 10A of the cutting device 100A shown in FIG. 10. FIG. 12A is a perspective view of a lower surface side of an upper die 20A of the cutting device 100A shown in FIG. 10. FIG. 12B is a perspective view illustrating the structure of the upper die 20A shown in FIG. 12A. FIG. 12B shows a state where the stripper plate 28 and the main body 25 of a frame-shaped part 24A of the upper die 20A shown in FIG. 12A are removed.

As shown in FIG. 10 and FIG. 11A, the lower die 10A of the cutting device 100A of this embodiment has two support parts 14 that are arrayed in one direction D1 orthogonal to the relative movement direction RD of the lower die 10A and the upper die 20A. The number of the support parts 14 may be any number larger than one, and may be three or larger. The bridges 15 of the lower die 10A each extend along the one direction D1 that is the array direction of the support parts 14, from a side surface of the support part 14 intersecting the one direction D1. The lower die 10A has two bridges 15 on each side surface of each support part 14 intersecting the one direction D1, at an interval in the extension direction of the first lower-die edge 11 extending along that side surface. The lower die 10A has two bridges 15 also between one support part 14 and the other support part 14.

However, the lower die 10A of the cutting device 100A of this embodiment does not have the bridges 15 on side surfaces of the support parts 14 extending along the one direction D1 that is the array direction of the support parts 14. A die 19A of the lower die 10A has the holes 19h which are provided on both sides of the support parts 14 in a direction D2 intersecting the one direction D1 and between each pair of bridges 15, and through which the offcut L of the sheet base material PS falls. As shown in FIG. 11B, the holes 19h of the die 19A of the lower die 10A communicate with the holes 17h extending through the lower die set 17.

As shown in FIG. 12A and FIG. 12B, the upper die 20A of the cutting device 100A of this embodiment includes two guides 29 and the frame-shaped part 24A disposed around the guides 29. The frame-shaped part 24A has the main bodies 25 and the protrusible parts 26. The protrusible parts 26 are disposed between the two guides 29 and on both sides of the two guides 29 in the one direction D1 that is the array direction of the guides 29. The main bodies 25 are disposed on both sides of the two guides 29 in the direction D2 intersecting the one direction D1. For example, the frame-shaped part 24A of the upper die 20A is provided so as to surround each support part 14 of the lower die 10A.

In the cutting device 100A of this embodiment, when the lower die 10A and the upper die 20A are moved relative to each other so as to come closer to each other in the state where the sheet base material PS is disposed between the lower die 10A and the upper die 20A, the sheet base material PS is sandwiched between the upper end surfaces 14a of the support parts 14 of the lower die 10A and the lower end surface 24b of the frame-shaped part 24A and the lower end surfaces 29a of the guides 29 of the upper die 20A. When the frame-shaped part 24A of the upper die 20A is further relatively moved toward the lower die 10A in this state, the lower end surface 24b of the frame-shaped part 24A of the upper die 20A is moved to below the upper end surfaces 14a of the two support parts 14 of the lower die 10A, around the support parts 14 and between the support parts 14.

Thus, the sheet base material PS is shorn between the first lower-die edges 11 provided at the outer edges of the upper end surfaces 14a of the support parts 14 of the lower die 10A and the first upper-die edge 21 provided at the inner edge of the lower end surface 24b of the frame-shaped part 24A of the upper die 20A. As a result, a plurality of sheet materials S1 is punched out of the sheet base material PS at once, and the sheet base material PS is separated into the sheet materials S1 and the offcut L (frame-shaped offcut Lf).

The lower die 10A may have the outer peripheral part 16 as shown in FIG. 3 around the support parts 14. In this case, as in the example shown in FIG. 4A, the sheet base material PS is shorn and the frame-shaped offcut Lf is cut in a state where the wall surface 23w extending upward from the third upper-die edge 23 provided at the outer edge of the lower end surface 24b of the frame-shaped part 24A of the upper die 20A is guided by the wall surface 13w extending downward from the third lower-die edge 13 provided at the inner edge of the upper end surface of the outer peripheral part 16 of the lower die 10A. For example, the conveying direction of the rectangular sheet base material PS is the direction D2 orthogonal to the one direction D1 that is the array direction of the support parts 14.

According to the cutting device 100A of this embodiment, the lower die 10A has the plurality of support parts 14, which allows the plurality of sheet materials S1 to be cut out of the sheet base material PS at the same time and can thereby improve the productivity of the sheet materials S1.

The offcut L (frame-shaped offcut Lf) of the sheet base material PS that is left behind after the sheet materials S1 are punched out is disposed on the upper end surfaces 15a of the pairs of bridges 15 extending along the one direction D1 from the side surfaces, intersecting the one direction D1, of the support parts 14 arrayed in the one direction D1. Two bridges 15 are disposed on each side surface of each support part 14 intersecting the one direction D1 that is the array direction of the support parts 14, at an interval in the extension direction of the first lower-die edge 11 extending along that side surface. Thereafter, the offcut segmenting step of segmenting the frame-shaped offcut Lf is performed.

Figure 13:
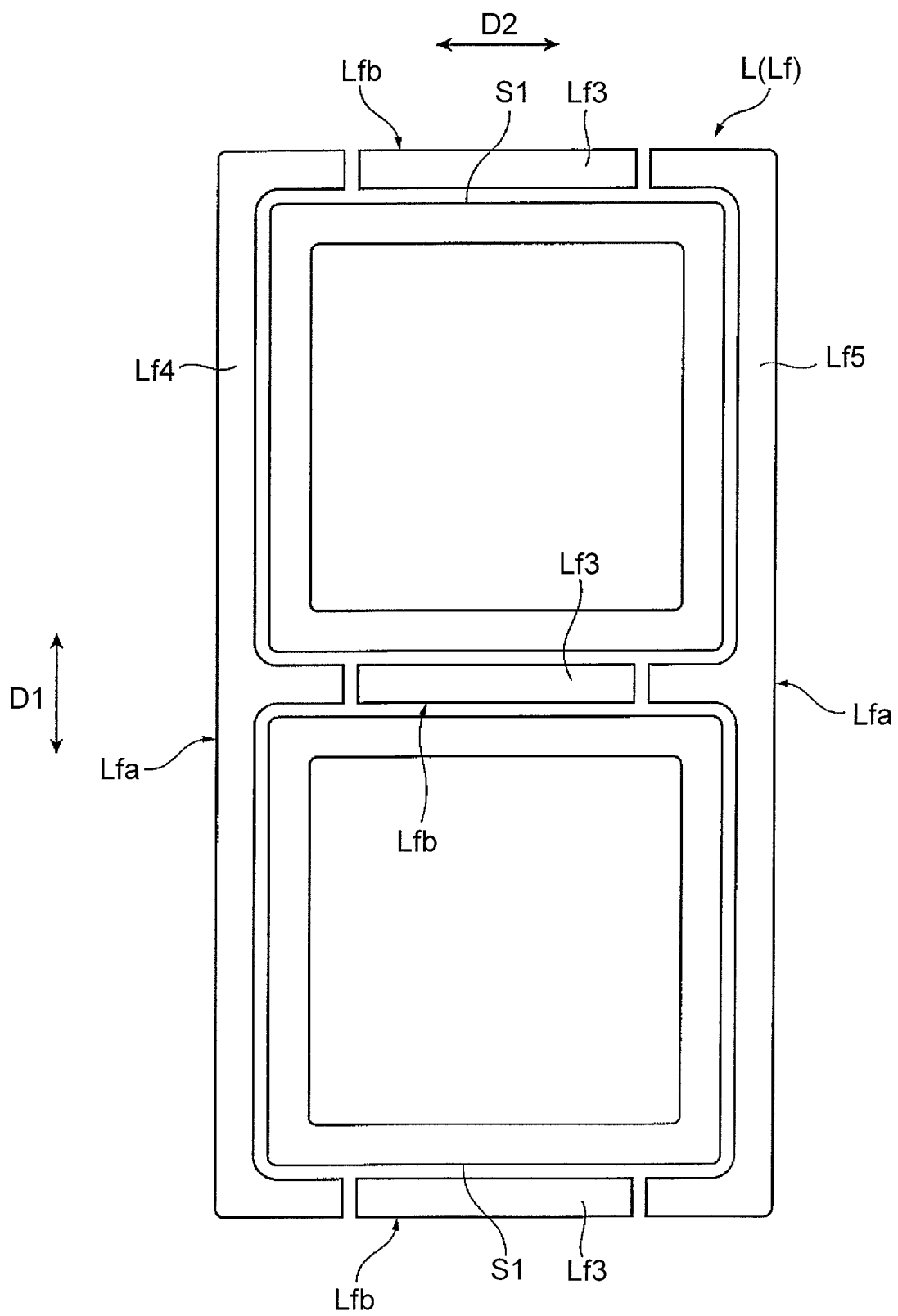
FIG. 13 is a plan view showing an example of sheet materials and an offcut.

FIG. 13 is a plan view showing an example of the sheet materials S1 and the frame-shaped offcut Lf after the offcut segmenting step using the cutting device 100A of this embodiment. The frame-shaped offcut Lf extends in the one direction D1 that is the array direction of the support parts 14, and has a plurality of openings that is formed as the sheet materials S1 are punched out at an interval in the one direction D1. More specifically, the frame-shaped offcut Lf has longitudinal frame parts Lfa extending in the one direction D1, on both sides of the openings in a direction intersecting the one direction D1, and cross frame parts Lfb extending in the direction D2 intersecting the one direction D1, on both sides of each opening in the one direction D1 and between the openings.

Thus, the frame-shaped offcut Lf is supported at each cross frame part Lfb from below by the two bridges 15 that are disposed on the side surface of the support part 14 intersecting the one direction D1, at an interval in the extension direction of the first lower-die edge 11 extending along the side surface as shown in FIG. 9A. In this state, each cross frame part Lfb of the frame-shaped offcut Lf is sandwiched between the pair of second lower-die edges 12 provided at the inner edges, facing each other, of the upper end surfaces 15a of the two bridges 15 disposed at an interval and the pair of second upper-die edges 22 provided at both end edges of the lower end surface of the protrusible part 26 of the upper die 20A.

When the lower end surface of the protrusible part 26 of the upper die 20A is protruded in this state to below the upper end surfaces 15a of the bridges 15 of the lower die 10A as shown in FIG. 9B, the cross frame part Lfb of the frame-shaped offcut Lf is shown between the pair of second lower-die edges 12, facing each other, of the two adjacent bridges 15 and the pair of second upper-die edges 22 of the lower end surface of the protrusible part 26. As a result, as shown in FIG. 13, the frame-shaped offcut Lf is divided into a plurality of cross frame offcuts Lf3 excluding both ends of the cross frame parts Lfb, a first longitudinal frame offcut Lf4 formed by one end of each cross frame part Lfb and one longitudinal frame part Lfa, and a second longitudinal frame offcut Lf5 formed by the other end of each cross frame part Lfb and the other longitudinal frame part Lfa.

As shown in FIG. 9B, each cross frame offcut Lf3 between the two adjacent bridge 15 is not supported by the two bridges 15, so that each cross frame offcut Lf3 falls through the clearance between the two bridges 15 and is collected. Moreover, the first longitudinal frame offcut Lf4 and the second longitudinal frame offcut Lf5 are each supported at portions of the ends of the cross frame parts Lfb from below by the bridges 15 but not supported at the longitudinal frame part Lfa by the bridges 15, so that, under the force of gravity, the first longitudinal frame offcut Lf4 and the second longitudinal frame offcut Lf5 tilt toward their respective longitudinal frame parts Lfa, fall so as to slide down from above the bridges 15, and are collected. Thus, the offcut L of the sheet base material PS is prevented from remaining on the lower die 10A, and the offcut L can be efficiently collected.

Figure 14:
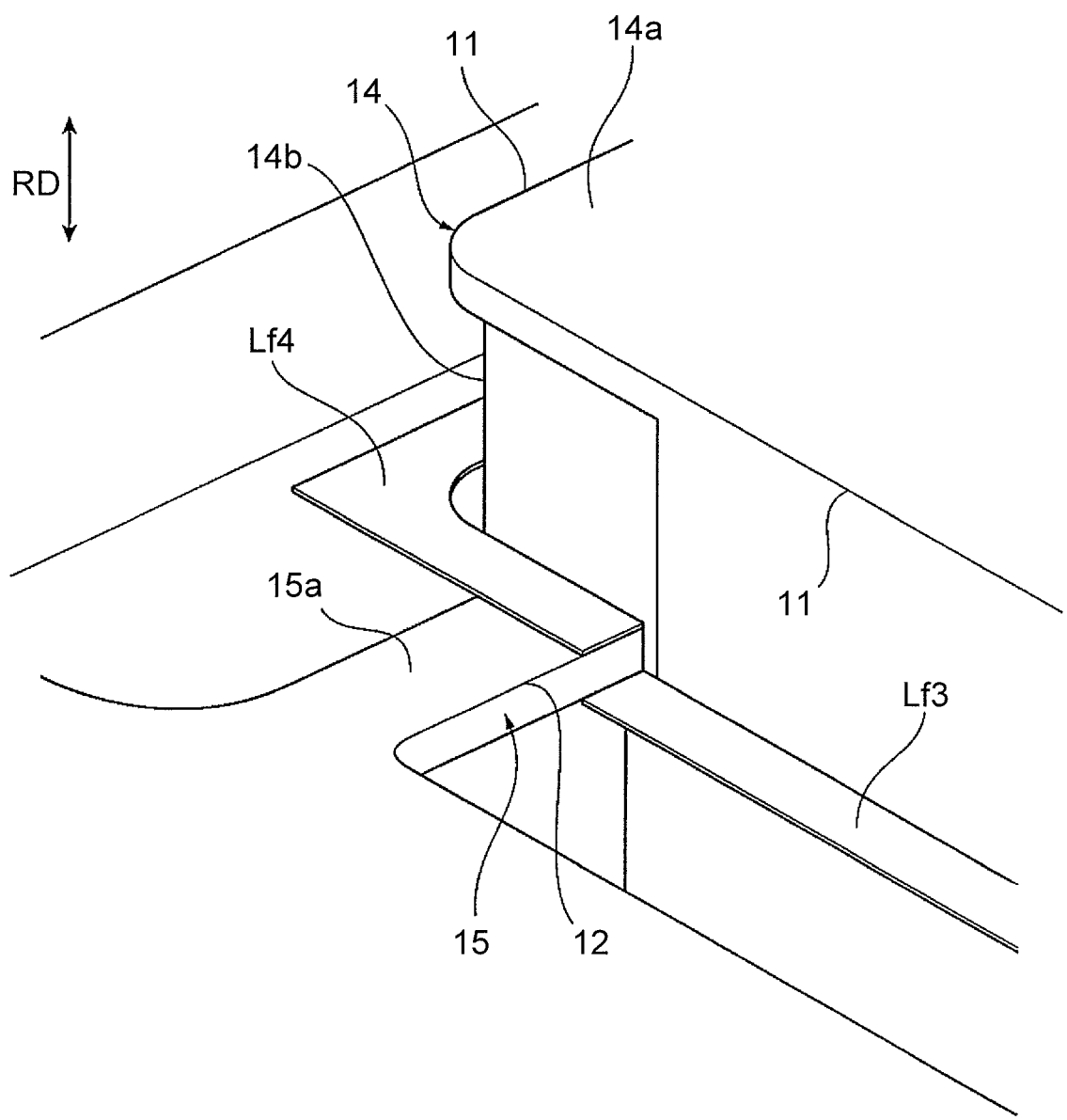
FIG. 14 is an enlarged view of part XIV of the lower die of the cutting device shown in FIG. 11A.
Figure 15:
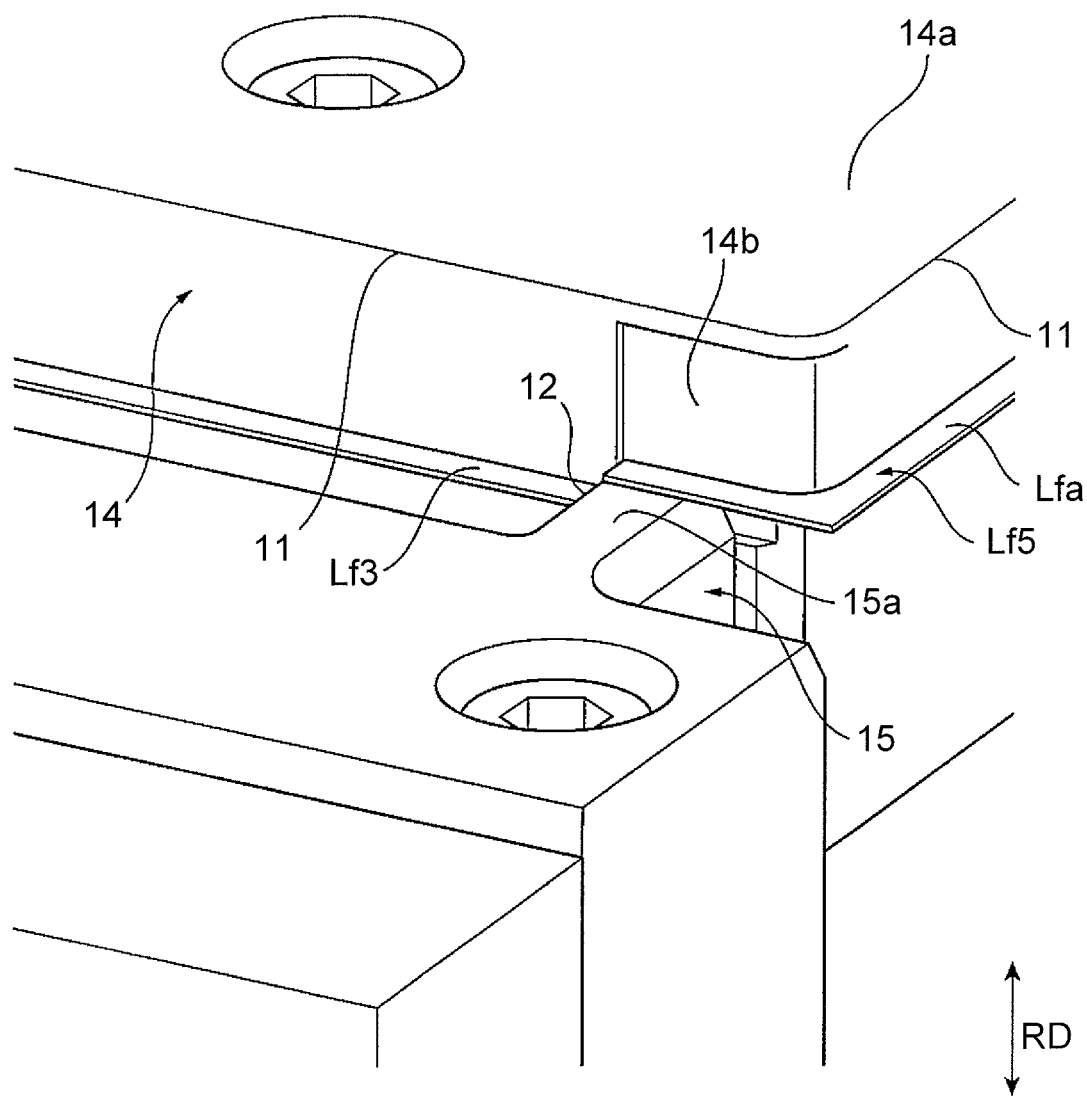
FIG. 15 is an enlarged view of part XV of the lower die of the cutting device shown in FIG. 11A.

FIG. 14 is an enlarged view of part XIV of the lower die 10A of the cutting device 100A shown in FIG. 11A. FIG. 15 is an enlarged view of part XV of the lower die 10A of the cutting device 100A shown in FIG. 11A. In the cutting device 100A of this embodiment, for example, a recess 14b is formed in a side surface of the support part 14, above the bridge 15. For example, the recess 14b is provided between the second lower-die edge 12 of the upper end surface 15a of the bridge 15 and the first lower-die edge 11 of the upper end surface 14a of the support part 14 as seen in the relative movement direction RD of the lower die 10A and the upper die 20A, and is formed from inner edges of the upper end surfaces 15a of the two adjacent bridges 15 along the first lower-die edge 11 of the upper end surface 14a of the support part 14. In the example shown in FIG. 14 and FIG. 15, each recess 14b is provided at a corner between side surfaces of the quadrangular prism-shaped support part 14.

In this case, a clearance can be formed by the recess 14b between the side surface of the support part 14 and each of the first longitudinal frame offcut Lf4 and the second longitudinal frame offcut Lf5 when, under the force of gravity, the first longitudinal frame offcut Lf4 and the second longitudinal frame offcut Lf5 tilt toward their respective longitudinal frame parts Lfa and fall so as to slide down from above the bridges 15. Thus, the first longitudinal frame offcut Lf4 and the second longitudinal frame offcut Lf5 are prevented from sticking to the side surface of the support part 14, and the first longitudinal frame offcut Lf4 and the second longitudinal frame offcut Lf5 are allowed to fall and be collected more reliably.

While the embodiments of the present disclosure have been specifically described above using the drawings, the specific configurations are not limited to these embodiments. Any design changes etc. within the scope of the gist of the present disclosure are included in the disclosure.

What is claimed is:

1. A cutting device configured to cut a sheet material out of a sheet base material by shearing, the cutting device comprising:
   a lower die; and
   an upper die that is movable relative to the lower die, wherein:
   the lower die comprises a first lower-die edge configured to extend along a desired outline shape of the sheet material, and a plurality of second lower-die edges disposed vertically below the first lower-die edge and each extending in a direction intersecting an extension direction of the first lower-die edge;
   the upper die comprises a first upper-die edge configured to extend in a direction parallel to the extension direction of the first lower-die edge, and a plurality of second upper-die edges that is provided so as to be protrusible to be vertically below the second lower-die edges;
   the first upper-die edge and the first lower-die edge being configured to shear the sheet base material along the desired outline shape of the sheet material as the upper die is moved relative to the lower die and the first upper-die edge passes the first lower-die edge to separate a frame-shaped offcut of the sheet base material from the sheet material,
   the second upper-die edges being configured to segment the frame-shaped offcut as the second upper-die edges pass the second lower-die edges;
   the lower die comprising at least one support part configured to support the sheet material shorn out of the sheet base material, wherein an outer edge of an upper end surface of the at least one support part includes the first lower-die edge;
   the upper die comprising a frame-shaped part configured to surround the first lower-die edge, wherein an inner edge of a lower end surface of the frame-shaped part includes the first upper-die edge;
   the lower die further comprising a third lower-die edge extending so as to surround the first lower-die edge;
   the upper die further comprising a third upper-die edge configured to extend along an extension direction of the third lower-die edge; and
   the second upper-die edges protruding vertically downward and being configured to be inserted into a clearance between the first lower-die edge and the third lower-die edge as the second upper-die edges segment the frame-shaped offcut as the second upper-die edges pass the second lower-die edges.

2. The cutting device according to claim 1, wherein:
   the lower die has a plurality of bridges each extending in a direction intersecting an extension direction of the first lower-die edge and located vertically below the first lower-die edge, and an outer peripheral part surrounding the at least one support part;
   side edges, facing each other, of upper end surfaces of a pair of the bridges facing each other in the extension direction of the first lower-die edge include the second lower-die edges;
   an inner edge of an upper end surface of the outer peripheral part includes the third lower-die edge;
   the frame-shaped part includes a main body and protrusible parts;
   an outer edge of the lower end surface of the frame-shaped part includes the third upper-die edge; and
   the protrusible parts are provided so as to be protrusible to be vertically below the main body, and are each configured to be inserted between the pair of the bridges that are facing each other, each of the protrusible parts including a lower end surface having opposite end edges, with both end edges intersecting an extension direction of the first upper-die edge and the third upper-die edge, and the opposite end edges forming the second upper-die edges.

3. The cutting device according to claim 2, wherein:
   the at least one support part comprises a plurality of support parts;
   the lower die has the plurality of support parts arrayed in one direction orthogonal to a relative movement direction of the upper die and the lower die; and
   the bridges each extend along the one direction from a side surface of one or more of the support parts intersecting the one direction.

4. The cutting device according to claim 3, wherein the lower die has two of the bridges extending from the side surface of one of the support parts, at an interval in the extension direction of the first lower-die edge extending along the side surface.

5. The cutting device according to claim 4, wherein a recess is defined in the one of the side surface of the support parts, vertically above the bridges.

6. The cutting device according to claim 1, wherein:
   the upper die includes, on an inner side of the frame-shaped part, a guide that guides movement of the frame-shaped part, the sheet material being sandwiched between the guide and the at least one support part of the lower die; and
   the guide has a raised portion that is provided at a peripheral edge of a lower end surface of the guide and the raised portion protrudes vertically downward.

7. A sheet material manufacturing method of cutting a sheet material out of a sheet base material by shearing, the method comprising:
   punching out the sheet material using a lower die and an upper die that are movable relative to each other, by shearing the sheet base material between a first lower-die edge extending along an outline shape of the sheet material and a first upper-die edge extending along the first lower-die edge;
   in the punching out of the sheet material, shearing and segmenting a frame-shaped offcut of the sheet base material that is left behind after the sheet material is punched out, between a plurality of second upper-die edges and a plurality of second lower-die edges that is provided vertically below the first lower-die edge, by protruding the second upper-die edges to be vertically below the second lower-die edges; and
   inserting the second upper-die edges into a clearance between the first lower-die edge and a third lower-die edge extending so as to surround the first lower-die edge as a third upper-die edge extending along the third lower-die edge enters the clearance and the second upper-die edges segment the frame-shaped offcut as the second upper-die edges pass the second lower-die edges.

8. The sheet material manufacturing method according to claim 7, wherein:
in the punching out of the sheet material, a wall surface extending vertically downward from the third lower-die edge guides a wall surface extending vertically upward from the third upper-die edge that extends along the third lower-die edge.

\* \* \* \* \*